US007604675B2

(12) United States Patent
Makarov et al.

(10) Patent No.: US 7,604,675 B2

(45) Date of Patent: Oct. 20, 2009

(54) SEPARATELY OPENING DUST CONTAINERS

(75) Inventors: Sergey V. Makarov, Solon, OH (US); Steven J. Paliobeis, Painesville, OH (US); Jeffrey C. Loebig, Twinsburg, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 517 days.

(21) Appl. No.: 11/607,362

(22) Filed: Dec. 1, 2006

(65) Prior Publication Data

US 2007/0289267 A1 Dec. 20, 2007

Related U.S. Application Data

(60) Provisional application No. 60/814,661, filed on Jun. 16, 2006, provisional application No. 60/818,149, filed on Jun. 30, 2006, provisional application No. 60/837,988, filed on Aug. 16, 2006.

(51) Int. Cl.
*B01D 45/12* (2006.01)

(52) U.S. Cl. ............................ 55/345; 55/337; 55/343; 55/349; 55/429; 55/DIG. 3; 55/432; 55/433; 15/353; 15/350

(58) Field of Classification Search .................. 55/345, 55/337, 343, 349, 429, 432–433, DIG. 3; 15/353, 350

See application file for complete search history.

(56) References Cited

U.S. PATENT DOCUMENTS

| | | | |
|---|---|---|---|
| 2,171,248 | A | 8/1939 | Van Berkel |
| 5,129,124 | A | 7/1992 | Gamou et al. |
| 6,896,720 | B1 | 5/2005 | Arnold et al. |

(Continued)

FOREIGN PATENT DOCUMENTS

| | | |
|---|---|---|
| EP | 1 525 839 A2 | 4/2005 |

(Continued)

OTHER PUBLICATIONS

Communication relating to the results of the partial international search for International Application No. PCT/US2007/013678 mailed Oct. 22, 2007.

*Primary Examiner*—Robert J Hill, Jr.
*Assistant Examiner*—Dung Bui
(74) *Attorney, Agent, or Firm*—Fay Sharpe LLP

(57) ABSTRACT

The present invention relates to a home cleaning appliance including a housing including a nozzle having a main suction opening and a brush. An air stream suction source, mounted to the housing, includes a suction airstream inlet and a suction airstream outlet. The suction source selectively establishes and maintains a suction airstream from the nozzle main suction opening to the airstream outlet. A cyclone main body is mounted to the housing and is in communication with the nozzle main suction opening. The cyclone main body includes an upstream, first, cyclonic separator for separating dust from dust-laden air, and at least one downstream, second, cyclonic separator for separating remaining dust particles from the air. A dirt cup is connected to the cyclone main body. The dirt cup includes a first particle collector communicating with the first separator for collecting dust particles separated by the first separator, and a second particle collector communicating with the at least one second separator for collecting dust particles separated by the at least one second separator. The first particle collector and the second particle collector are configured to empty independently of each other.

24 Claims, 32 Drawing Sheets

U.S. PATENT DOCUMENTS

| | | | | |
|---|---|---|---|---|
| 7,097,680 | B2 * | 8/2006 | Oh | 55/343 |
| 7,462,212 | B2 * | 12/2008 | Han et al. | 55/343 |
| 2003/0200734 | A1 | 10/2003 | Conrad | |
| 2005/0172584 | A1 | 8/2005 | Oh et al. | |
| 2006/0168923 | A1 * | 8/2006 | Lee et al. | 55/345 |
| 2007/0079586 | A1 * | 4/2007 | Kim | 55/345 |
| 2007/0079587 | A1 * | 4/2007 | Kim | 55/349 |
| 2007/0084160 | A1 * | 4/2007 | Kim | 55/345 |
| 2007/0089381 | A1 * | 4/2007 | Ni | 55/345 |
| 2007/0095029 | A1 * | 5/2007 | Min et al. | 55/345 |
| 2008/0289140 | A1 * | 11/2008 | Courtney et al. | 15/353 |

FOREIGN PATENT DOCUMENTS

| | | | |
|---|---|---|---|
| EP | 1 674 023 | A1 | 6/2006 |
| JP | 08-322769 | | 12/1996 |
| KR | 100569330 | | 4/2006 |
| WO | WO 00/44272 | | 8/2000 |

* cited by examiner

SEPARATELY OPENING DUST CONTAINERS

CROSS REFERENCE TO RELATED APPLICATIONS

This application claims priority from U.S. Provisional Patent Application Ser. No. 60/814,661 filed Jun. 16, 2006; U.S. Provisional Patent Application Ser. No. 60/818,149 filed Jun. 30, 2006; and U.S. Provisional Patent Application Ser. No. 60/837,988 filed Aug. 16, 2006. Each provisional patent application is expressly incorporated herein by reference, in its entirety.

BACKGROUND OF THE INVENTION

The present invention relates to vacuum cleaners. More particularly, the present invention relates to dual stage cyclonic vacuum cleaners used for suctioning dirt and debris from carpets and floors. Such vacuum cleaners can be upright, canister, hand-held or stationary, built into a house. Moreover, cyclonic designs have also been used on carpet extractors and "shop" type vacuum cleaners.

Upright vacuum cleaners are well known in the art. The two major types of traditional vacuum cleaners are a soft bag vacuum cleaner and a hard shell vacuum cleaner. In the hard shell vacuum cleaner, a vacuum source generates the suction required to pull dirt from the carpet or floor being vacuumed through a suction opening and into a filter bag or a dust cup housed within the hard shell upper portion of the vacuum cleaner. After multiple uses of the vacuum cleaner, the filter bag must be replaced or the dust cup emptied.

To avoid the need for vacuum filter bags, and the associated expense and inconvenience of replacing the filter bag, another type of upright vacuum cleaner utilizes cyclonic air flow and perhaps one or more filters, rather than a replaceable filter bag, to separate the dirt and other particulates from the suction air stream. If filters are used, they would need infrequent replacement.

While some prior art cyclonic air flow vacuum cleaner designs and constructions are acceptable, the need exists for continued improvements and alternative designs for such vacuum cleaners. For example, it would be desirable to simplify assembly and improve filtering and dirt removal.

Accordingly, the present invention provides a new and improved upright vacuum cleaner having a dual stage cyclonic air flow design which overcomes certain difficulties with the prior art designs while providing better and more advantageous overall results.

BRIEF DESCRIPTION

In accordance with one aspect of the present invention, a home cleaning appliance comprises a housing comprising a nozzle including a main suction opening and a brush. An air stream suction source, mounted to the housing, includes a suction airstream inlet and a suction airstream outlet. The suction source selectively establishes and maintains a suction airstream from the nozzle main suction opening to the airstream outlet. A cyclone main body is mounted to the housing and is in communication with the nozzle main suction opening. The cyclone main body includes an upstream, first, cyclonic separator for separating dust from dust-laden air, and at least one downstream, second, cyclonic separator for separating remaining dust particles from the air. A dirt cup is connected to the cyclone main body. The dirt cup includes a first particle collector communicating with the first separator for collecting dust particles separated by the first separator, and a second particle collector communicating with the at least one second separator for collecting dust particles separated by the at least one second separator. The first particle collector and the second particle collector are configured to empty independently of each other.

In accordance with another aspect of the present invention, an upright vacuum cleaner comprises a nozzle base having a main suction opening and a housing pivotally mounted on the nozzle base. An airstream suction source is mounted to one of the housing and the nozzle base for selectively establishing and maintaining a suction airstream from the nozzle main suction opening to an exhaust outlet of the suction source. A cyclone main body is mounted to the housing. The cyclone main body comprises a first upstream cyclone part for separating coarse dust from dust-laden air, and a second downstream cyclone part for separating remaining dust particles from the air. A first particle collector is mounted to the housing and communicates with the first cyclone part for collecting a first portion of dust particles. The first particle collector includes a first closure member operably secured to the first particle collector for emptying the first particle collector. A separate second particle collector is mounted to the housing and communicates with the second cyclone part for collecting a second portion of dust particles. The second particle collector includes a second closure member operably secured to the second particle collector for independent emptying of the second particle collector.

In accordance with yet another aspect of the present invention, a household vacuum cleaner comprises a first housing section including a suction opening, and at least one wheel to allow the first housing section to roll over a subjacent surface. A second housing section is connected to the first housing section. An airstream suction source is mounted to one of the first and second housing sections. A cyclone main body is mounted to the second housing section. The cyclone main body includes an upstream separator stage including an upstream cyclone, and a downstream separator stage including a plurality of downstream cyclones. The airstream suction source communicates with the first housing section suction opening via the cyclone main body so that an airstream flows from the suction opening through the upstream cyclone, the plurality of downstream cyclones and to an inlet of the airstream suction source. A first particle collector communicates with the upstream cyclone. A second particle collector communicates with the plurality of downstream cyclones. The second particle collector is configured to empty independently of the first particle collector.

In accordance with still yet another aspect of the present invention, a home vacuum cleaner includes a housing in fluid communication with a main suction opening and a brush roll rotatably mounted in the main suction opening. An airstream suction source is mounted to the housing for selectively establishing and maintaining a suction airstream flowing from the main suction opening to an exhaust outlet of the suction source. A dirt collector is mounted to the housing. The dirt collector comprises a first upstream cyclone part for separating dust from dust-laden air, a second downstream cyclone part for separating remaining dust particles from the air. A first particle collector communicates with the first cyclone part for collecting dust particles, and a second particle collector communicates with the second cyclone part for collecting dust particles. The first particle separator generally surrounds the second particle collector. The first particle collector and the second particle collector are configured to independently store and separately empty dirt and dust particles separated by the respective first and second cyclone parts.

Still other aspects of the invention will become apparent from a reading and understanding of the detailed description of the several embodiments described hereinbelow.

BRIEF DESCRIPTION OF THE DRAWINGS

The present invention may take physical form in certain parts and arrangements of parts, several embodiments of which will be described in detail in this specification and illustrated in the accompanying drawings which form a part of the disclosure.

DETAILED DESCRIPTION OF THE INVENTION

It should, of course, be understood that the description and drawings herein are merely illustrative and that various modifications and changes can be made in the structures disclosed without departing from the scope and spirit of the invention. Like numerals refer to like parts throughout the several views. It will also be appreciated that the various identified components of the vacuum cleaner disclosed herein are merely terms of art that may vary from one manufacturer to another and should not be deemed to limit the present invention. While the invention is discussed in connection with an upright vacuum cleaner, it could also be adapted for use with a variety of other household cleaning appliances, such as carpet extractors, bare floor cleaners, "shop" type cleaners, canister cleaners, hand-held cleaners and built-in units. Moreover, the design could also be adapted for use with robotic units which are becoming more widespread.

Figure 1:
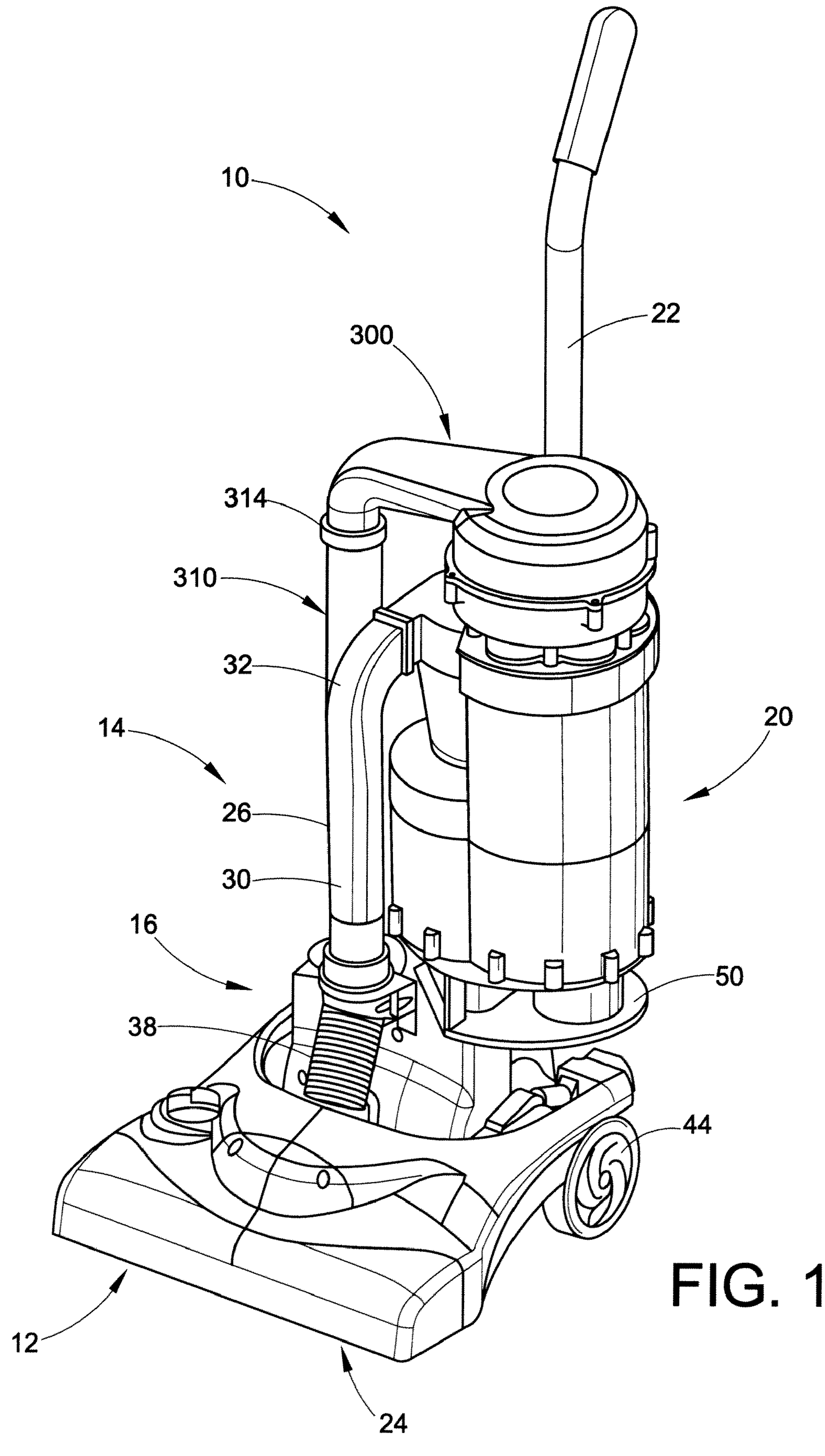
FIG. 1 is a front perspective view illustrating a dual stage cyclone vacuum cleaner in accordance with a first embodiment of the present invention.
Figure 2:
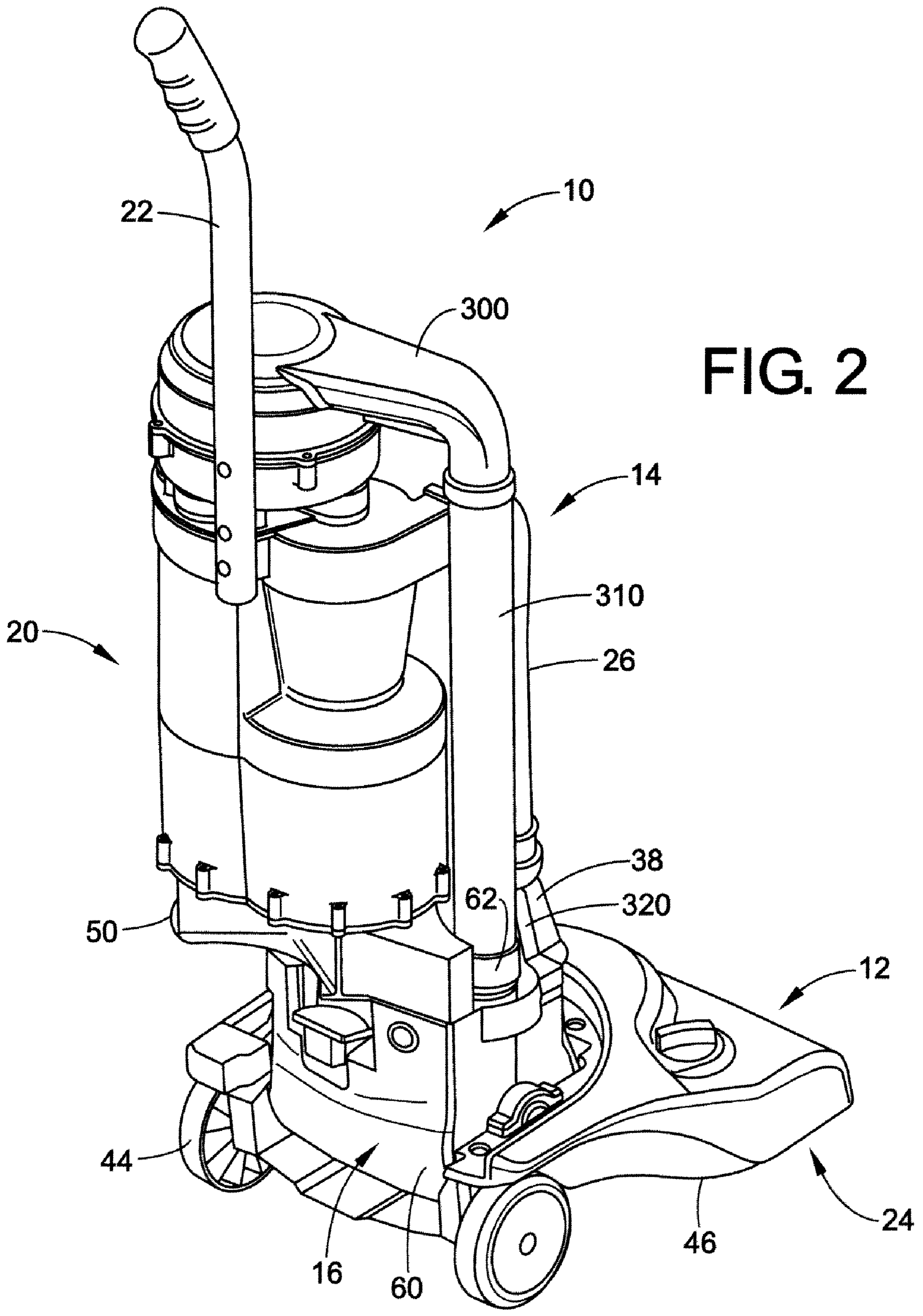
FIG. 2 is a rear perspective view of the dual stage cyclone vacuum cleaner of FIG. 1.

Referring now to the drawings, wherein the drawings illustrate the preferred embodiments of the present invention only and are not intended to limit same, FIGS. 1 and 2 illustrate an upright dual stage vacuum cleaner 10 including a nozzle base 12 and an upper housing 14 mounted atop the nozzle base via conventional means. Mounted to one of the nozzle base and the upper housing is an electric motor and fan assembly 16. The upper housing 14 releasably supports a dust collector 20.

The upper housing 14 and the nozzle base 12 are pivotally or hingedly connected through the use of trunnions or another suitable hinge assembly, so that the upper housing pivots between a generally vertical storage position (as shown) and an inclined use position. Both the nozzle base 12 and the upper housing 14 can be made from conventional materials, such as molded plastics and the like. A handle 22 extends upward from the upper housing 14, by which an operator of the dual stage cyclone vacuum cleaner 10 is able to grasp and maneuver the vacuum cleaner.

During vacuuming operations, the nozzle base 12 travels across a floor, carpet, or other subjacent surface being cleaned. As shown in FIG. 2, an underside of the nozzle base includes a main suction opening 24 formed therein, which can extend substantially across the width of the nozzle at the front end thereof. As is known, the main suction opening is in fluid communication with the dust collector 20 through a conduit, which can be a center dirt passage 26. Of course, the dirt passage can also be located to either side of the center line of the upper housing 14 and the nozzle base 12. As best shown in FIG. 1, the dirt passage includes a first section 30 having a longitudinal axis generally parallel to a longitudinal axis of the dust collector and a second section 32 having a longitudinal axis generally normal to the axis of the first section. The second section directs dirt-laden air tangentially into the dust collector.

With continued reference to FIGS. 1 and 2, a connector hose assembly, such as at 38, fluidly connects the air stream from the main suction opening to the center dirt passage. A rotating brush assembly (not visible) is positioned in the region of the nozzle main suction opening 24 for contacting and scrubbing the surface being vacuumed to loosen embedded dirt and dust. A plurality of wheels 44 and rollers 46 supports the nozzle base on the surface being cleaned and facilitates its movement thereacross. A latch assembly (not shown) can be mounted to the upper housing 14 for securing the dust collector thereto. A base member 50 can be mounted to the electric motor and fan assembly 16 for releasably supporting the dust collector 20. A support brace (not visible) can extend from the upper housing 14 and attach to the center dirt passage to provide support.

The electric motor and fan assembly 16 is housed in a motor housing 60 which includes a hose connector 62 (FIG. 2) and an exhaust duct (not visible). The motor and fan assembly generates the required suction airflow for cleaning operations by creating a suction force in a suction inlet and an exhaust force in an exhaust outlet. The motor and fan assembly airflow exhaust outlet can be in fluid communication with an exhaust grill (not visible) covering the exhaust duct. If desired, a final filter assembly can be provided for filtering the exhaust air stream of any contaminants which may have been picked up in the motor assembly immediately prior to its discharge into the atmosphere. The motor assembly suction inlet, on the other hand, is in fluid communication with the dust collector 20 of the vacuum cleaner 10 to generate a suction force therein.

Figure 3:
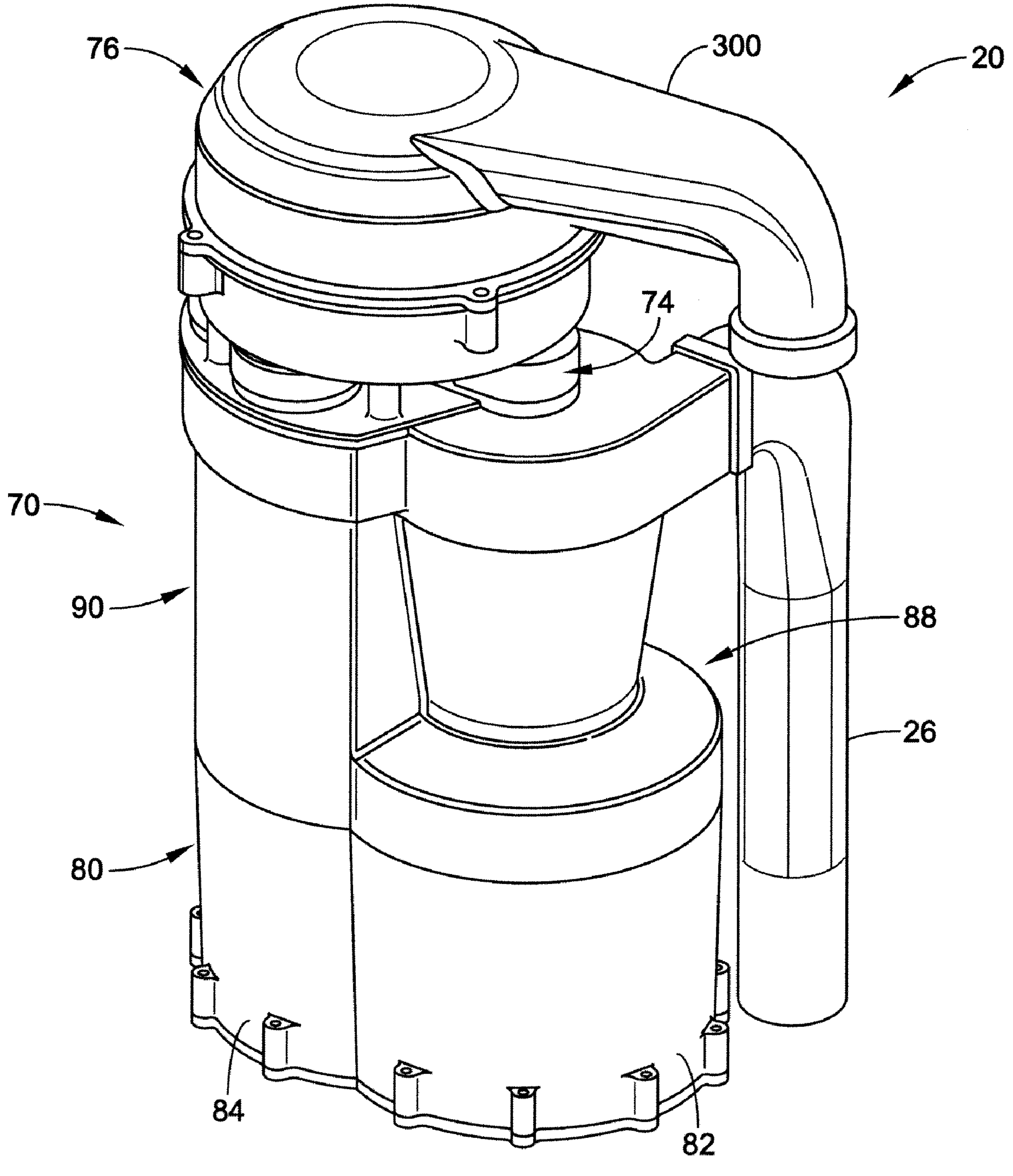
FIG. 3 is a rear perspective view of an assembled dust collector for the dual stage vacuum cleaner of FIG. 1.
Figure 4:
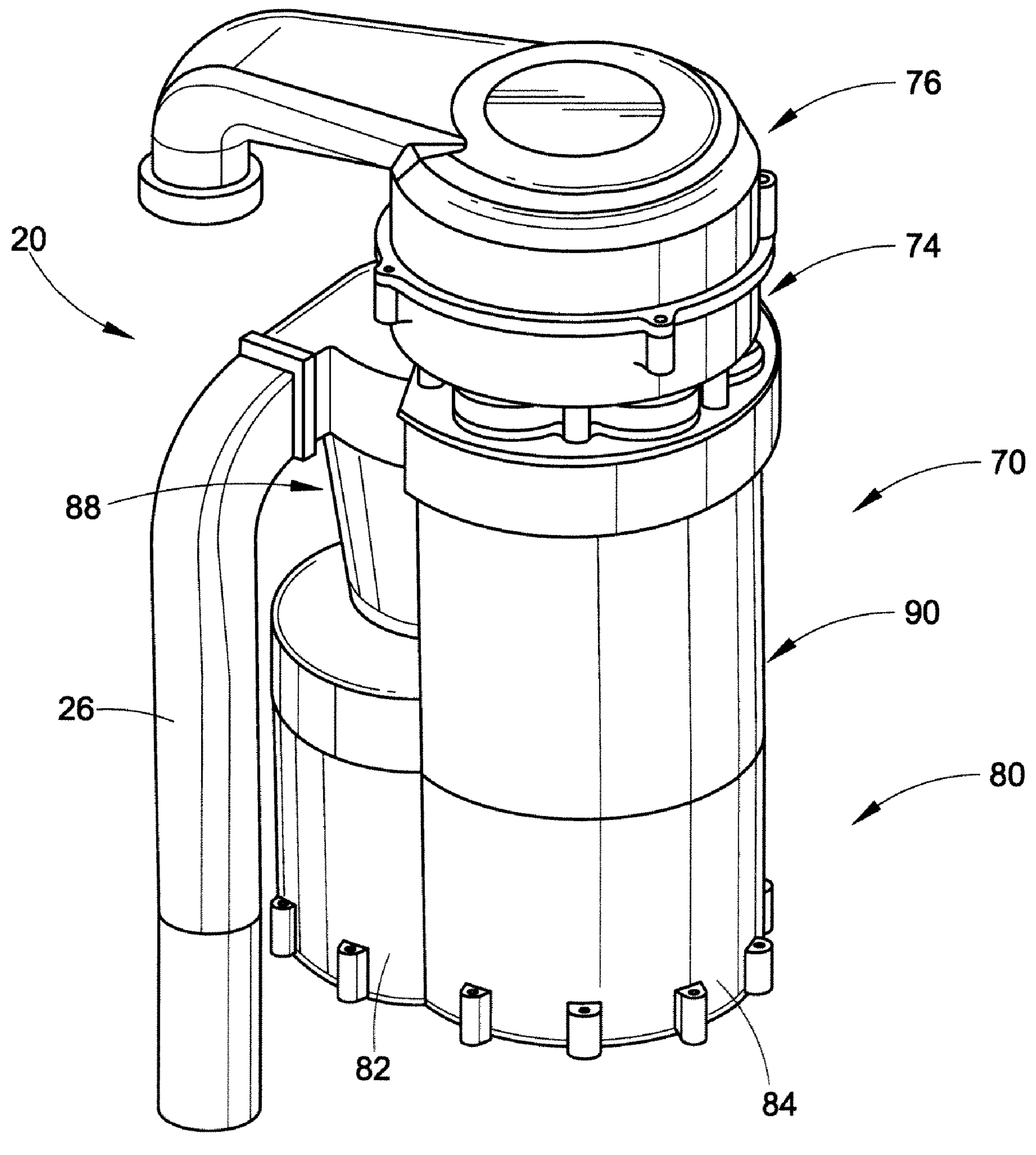
FIG. 4 is a front perspective view of the assembled dust collector for the dual stage vacuum cleaner of FIG. 1.

With reference now to FIGS. 3 and 4, the dust collector 20 includes a cyclone main body 70, an air manifold 74 and cover unit 76 attached to an upper portion of the cyclone main body, and a dirt cup 80 connected with a lower portion of the cyclone main body. The dirt cup includes a first dust collection chamber 82 and a second dust collection chamber 84. The cyclone main body 70 includes a first cyclone part 88 and a second cyclone part 90. As will be described in greater detail below, the first and second dust collection chambers are configured to independently store and empty dirt and dust particles separated by the respective first and second cyclone parts. The dirt cup 80 and the first cyclone part 88 can be made of a transparent material so that the presence of dirt can be seen in the dust collector 20.

Figure 5:
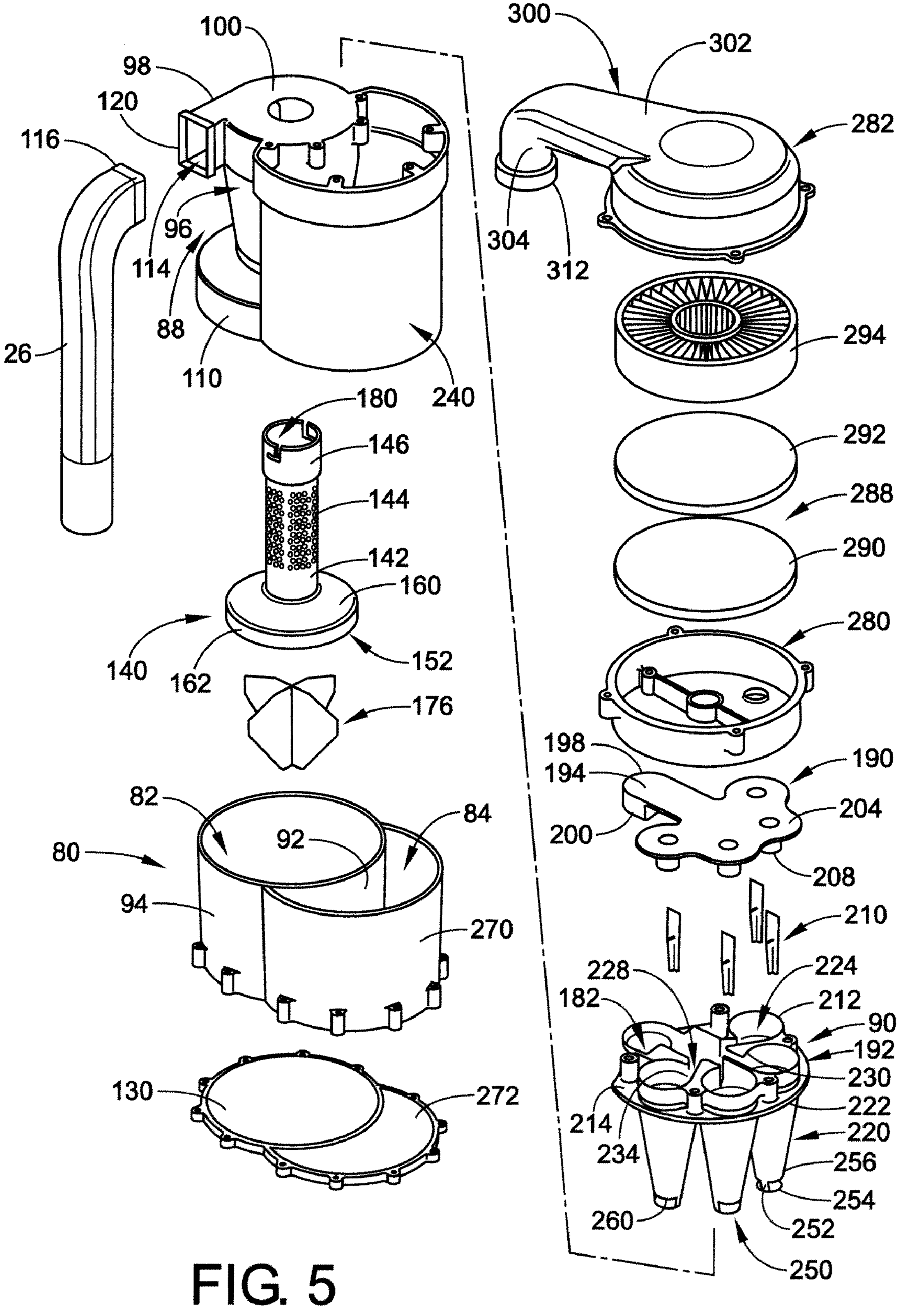
FIG. 5 is an enlarged exploded perspective view of the dust collector of the dual stage vacuum cleaner of FIG. 1, together with associated components thereof.
Figure 6:
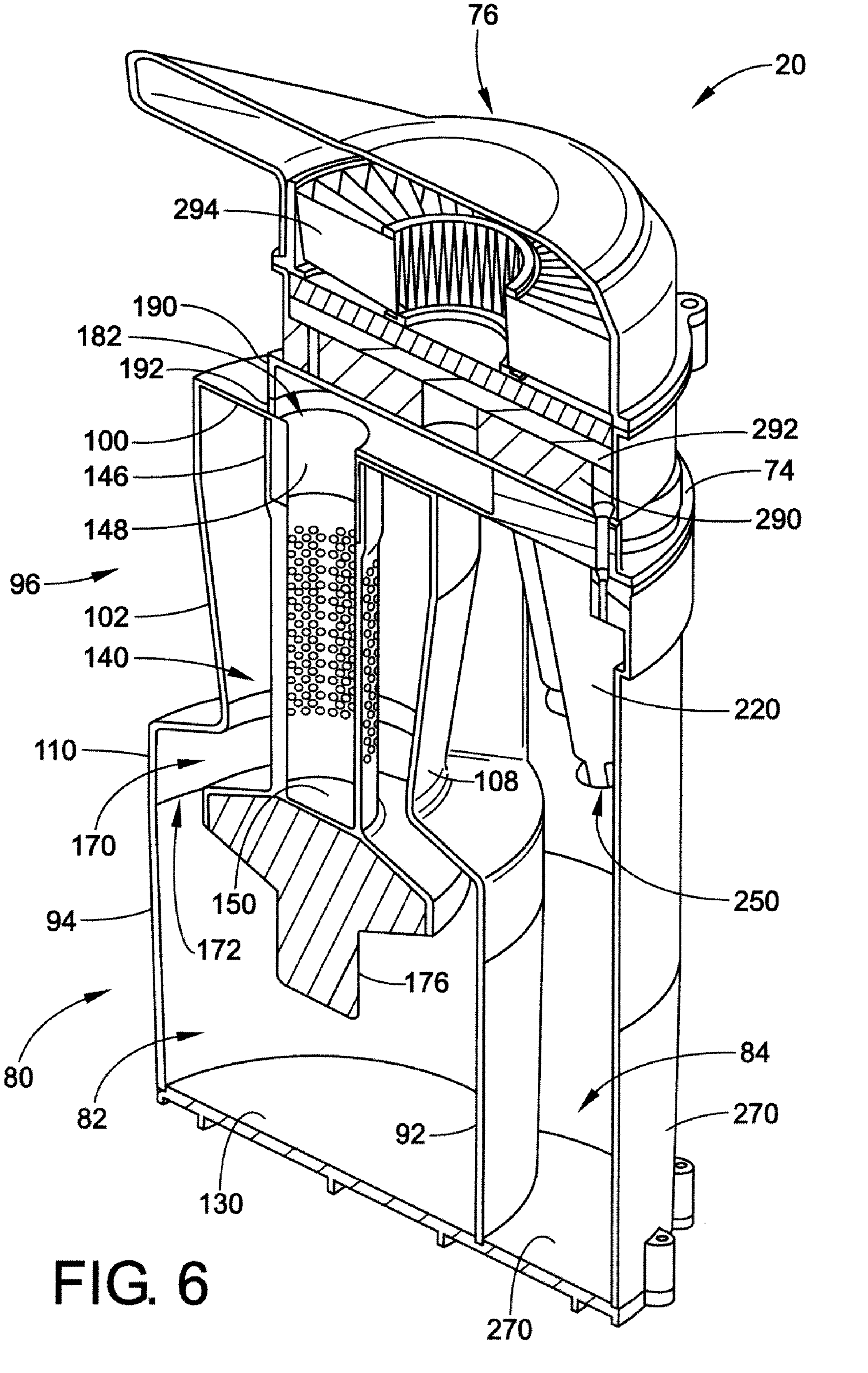
FIG. 6 is an enlarged cross-sectional view of the dust collector of FIG. 4.

As shown in FIGS. 5 and 6, a portion 92 of a first wall 94 of the first dust collection chamber 82 acts as a barrier between the first and second dust collection chambers 82 and 84. The barrier is curved toward the second dust collection chamber such that the first collection chamber can be formed in a cylindrical shape. Thus, the first and second dust collection chambers are completely separated from each other such that the airflow in one of the chambers does not affect the airflow in the other of the chambers. This further improves the dust collection efficiency of the dust collector 20.

As shown in FIGS. 5 and 6, the first cyclone part 88 comprises a generally frusto-conical shaped first stage cyclone separator 96. The first stage separator includes a dirty air inlet conduit 98, a top wall 100 and a sidewall 102 having an outer surface and an inner surface. The outer surface of the sidewall can form at least a part of an external surface of the vacuum cleaner 10. A lower end 108 of the first stage cyclone separator is secured to a lower skirt 110.

The conduit 98 has an inlet section 114 in fluid communication with an outlet end 116 of the center dirt passage 26 and an outlet section (not visible) in fluid communication with a dirty air inlet (not visible) of the first stage separator 96. The dirty air inlet of the separator can be generally rectangular in cross-section. It should be appreciated that the outlet section can have a varying dimension which allows the air stream to be drawn into the first stage separator 96 by way of the venturi effect, which increases the velocity of the air stream and creates an increased vacuum in the separator dirty air inlet. For example, the dirty air inlet conduit 98 can include a decreasing cross-sectional area. Alternatively, the dirty air conduit can transition from a rectangular cross-sectional area into, for example, a venturi-type discharge opening or a round discharge opening.

In the depicted embodiment, the conduit 98 has an enlarged inlet 120 having an inner dimension greater than an outer dimension of the outlet end 116 of the second section 32 of the center dirt passage 26, such that the outlet end is frictionally received in the enlarged inlet. However, it should be appreciated that other known ways of securing these components together are also contemplated.

The airflow into the first stage separator 96 is tangential which causes a vortex-type, cyclonic or swirling flow. Such vortex flow is directed downwardly in the first stage separator by the top wall 100. Cyclonic action in the first stage separator 96 removes a substantial portion of the entrained dust and dirt from the suction air stream and causes the dust and dirt to be deposited in the first dust collection chamber 82 of the dirt cup 80. As shown in FIG. 6, the lower skirt 110 is secured to an upper portion of the first wall 94 of the first dust collection chamber 82 via conventional means.

Figure 7:
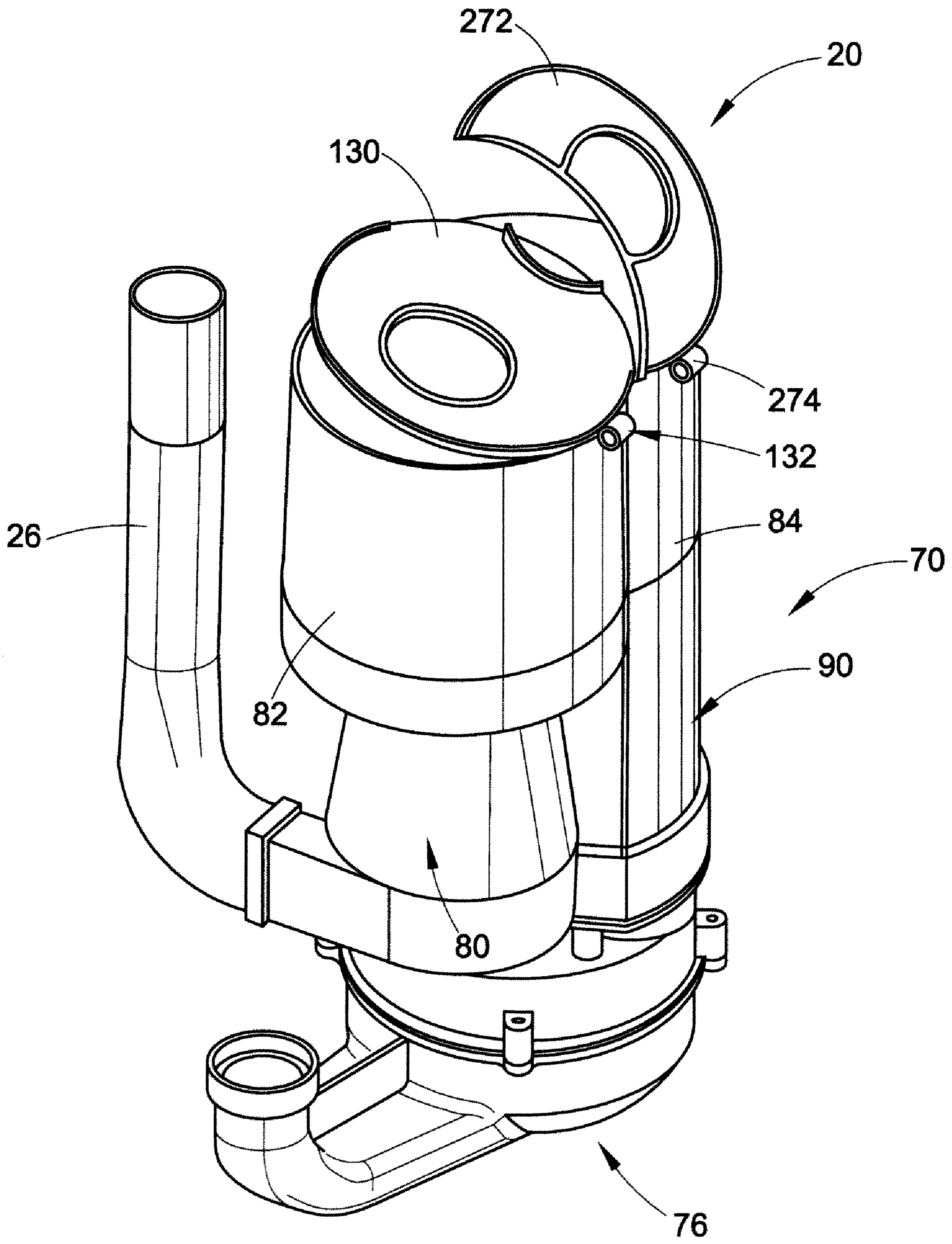
FIG. 7 is a bottom perspective view of the dust collector of FIG. 6 showing a first bottom lid for a first dust cup in a first open position and a second bottom lid for a second duct cup in a second open position.
Figure 8:
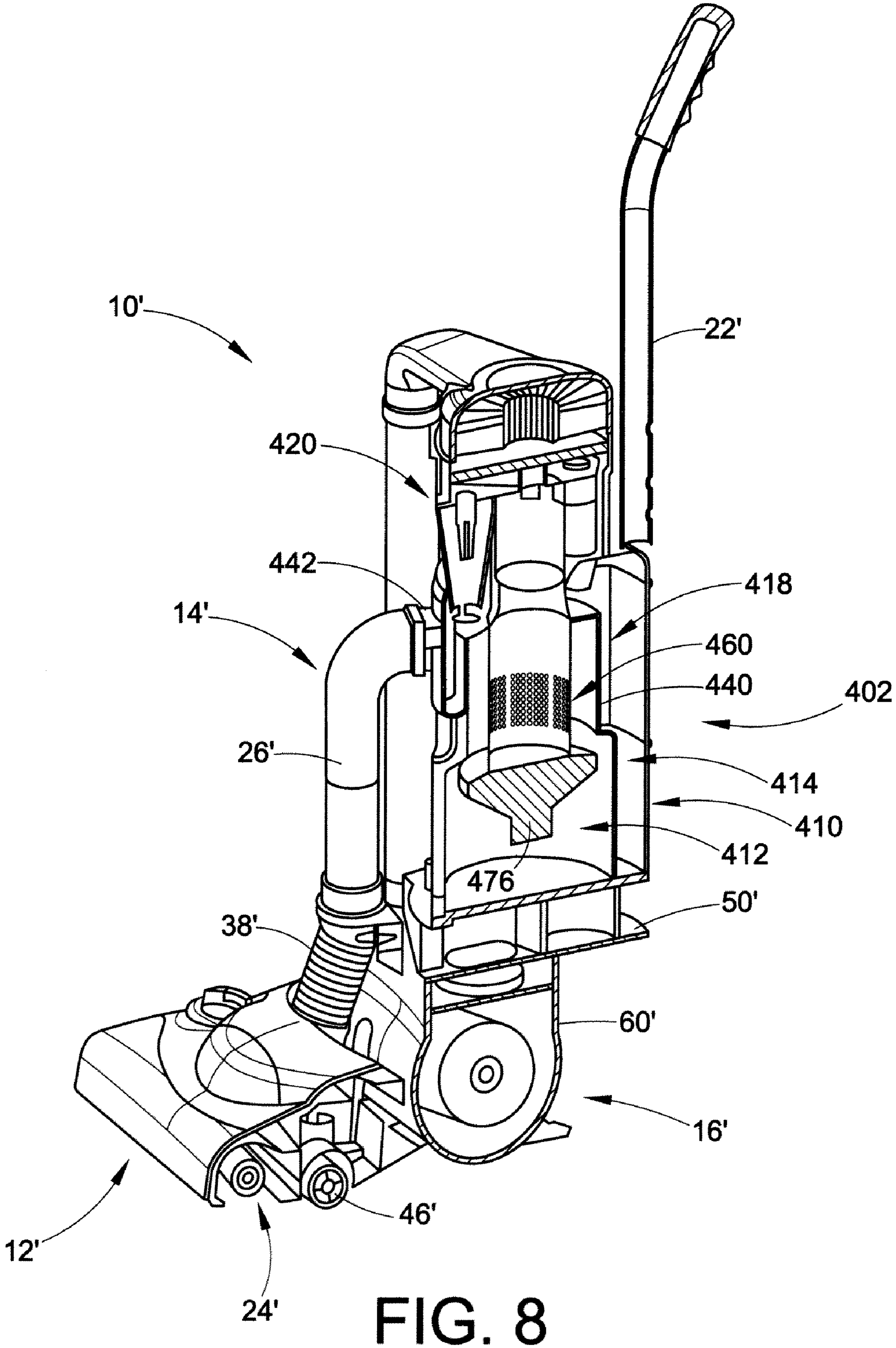
FIG. 8 is a right side cross-sectional view of a dual stage cyclone vacuum cleaner including a dust collector in accordance with a second embodiment of the present invention.

Operably secured to the dust collector 20 is a first closure member or bottom plate or lid 130, which allows for emptying of the first dust collection chamber 82. In the depicted embodiment, the bottom lid is pivotally secured to a lower portion of the first wall 94 of the dirt cup 80; although, this is not required. A seal ring (not shown) can be fitted around the first bottom lid to create a seal between the first lid and the dirt cup. As shown in FIG. 7, a first hinge assembly 132 can be used to mount the first bottom lid 130 to a bottom portion of the dirt cup. The first hinge assembly allows the first bottom lid to be selectively opened so that dirt and dust particles that were separated from the air stream by the first stage separator 96 can be emptied from the first dust collection chamber 82. A first latch assembly (not shown) can be located diametrically opposed from the first hinge assembly 132. Normally, the first latch assembly maintains the first bottom lid 130 in a closed position.

With reference to FIGS. 5 and 6, fluidly connecting the first cyclone part 88 to the second cyclone part 90 is a perforated tube 140. The perforated tube is disposed within the first stage separator 96 and extends longitudinally from the top wall 100 of the separator. In the present embodiment, the perforated tube has a longitudinal axis coincident with the longitudinal axes of the first stage separator 96 and the first dust collection chamber 82 thereby creating a central air path; although, it should be appreciated that the respective axes can be spaced from each other. In the depicted embodiment, the perforated tube includes a generally cylindrical section 142. A plurality of openings or perforations 144 is located around a portion of the circumference of the cylindrical section. The openings are useful for removing threads and fibers from the air stream which flows into the perforated tube. As might be expected, the diameter of the openings 144 and the number of those openings within the perforated tube 140 directly affect the filtration process occurring within the dirt cup. Also, additional openings result in a larger total opening area and thus the airflow rate through each opening is reduced. Thus, there is a smaller pressure drop and lighter dust and dirt particles will not be as likely to block the openings. The openings 144 serve as an outlet from the first stage separator 96, allowing the partially cleaned air to enter the second cyclone part 90. It should be appreciated that the cylindrical section 142 can have a varying dimension which allows the air stream to be drawn into the perforated tube 140 by way of the venturi effect, which increases the velocity of the air stream flowing through the perforated tube and creates an increased vacuum in the openings 144. For example, the cylindrical section 142 can include a decreasing cross-sectional area.

The perforated tube 140 can also include at least one fin (not shown) mounted to an inside surface of the cylindrical section 142 and extending generally longitudinally through the perforated tube. The at least one fin eliminates cyclonic flow inside the perforated tube.

An upper end 146 of the perforated tube is mounted to a mouth 148 extending downwardly from the top wall 100 of the first stage separator 96. In particular, the upper end of the perforated tube has an inner diameter greater than an outer diameter of the mouth such that the mouth is received in the upper end. These two elements can be secured together by adhesives, frictional welding or the like. It can be appreciated that the perforated tube can be made removable from the dust collector 20 for cleaning purposes.

Connected to a lower, closed end 150 of the perforated tube is a shroud 152 for retarding an upward flow of dirt and dust particles that have fallen below the lower end 108 of the first stage separator 96. The shroud has an outwardly flared section 160 and a flange 162 extending downwardly from the flared section. As is best illustrated in FIG. 6, a diameter of the shroud, particularly an end of the outwardly flared section, is larger than a diameter of the separator lower end 108 and an inside diameter of the first dust collection chamber 82 is substantially larger than the diameter of the separator lower end. This prevents dust from being picked up by flow of air streaming from the first dust collection chamber 82 toward the openings 144 of the perforated tube 140. The flared section 160 of the shroud 152, which is generally parallel to the lower skirt 110, and the lower skirt define a first air channel 170. The shroud flange 162, which is generally parallel to the first dust collection chamber wall 94, and the wall define a second air channel 172. The first and second air channels direct air from the first stage separator 96 into the first dust collection chamber 82. The first air channel and the second air channel have a substantially constant volume for maintaining airflow velocity. Also, the volume of the first air channel is approximately equal to the volume of the second air channel.

A laminar flow member, such as one or more baffles or fins 176, is mounted to the closed lower end 150 of the perforated tube 140. At least a portion of the laminar flow member is encircled by the shroud 152. The laminar flow member extends generally along a longitudinal axis of the perforated tube and partially into the first dust collection chamber 82. As shown in FIG. 5, the depicted baffle 176 can be cruciform in shape and include a cross blade assembly, which can be formed of two flat blade pieces that are oriented approximately perpendicular to each other. It should be appreciated that the baffles 176 are not limited to the configuration shown in FIG. 5 but may be formed of various shapes. For example, if a blade is employed, it can have a rectangular shape, a triangular shape or an elliptical shape, when viewed from its side. Also, in addition to a cross blade design, other designs are also contemplated. Such designs can include blades that are oriented at angles other than normal to each other or that use more than two sets of blades. The blades can be twisted along their length, if so desired, as this may reduce the noise generated by the vacuum cleaner's cyclonic operation. These baffles can assist in allowing dirt and dust particles to fall out of the air stream between the perforated tube lower end 150 and the first bottom lid 130 of the first dust collection chamber 82.

With continued reference to FIGS. 5 and 6, an upper end or air outlet 180 of the perforated tube 140 is in fluid communication with an air inlet section 182 of the air manifold 74 positioned above the first stage separator 96. The air manifold includes a top guide plate 190 and a bottom guide plate 192. The guide plates direct partially cleaned air from the perforated tube 140 to the second cyclone part 90.

The top guide plate 190 is provided under the cover unit 76 and includes a wall 194. Extending downwardly from a first end portion 198 of the wall is a generally arcuate flange 200, which forms a portion of the manifold air inlet section 182. Located at a second end portion 204 of the top wall 194 is a plurality of discharge guide tubes 208. As shown in FIG. 5, each of the discharge guide tube 208 has a generally cylindrical shape and projects downward from the top guide plate 190. The discharge guide tubes direct the cleaned air exhausted from the second cyclone part 90 into the cover unit 76. Each discharge guide tube can include a laminar flow member to stop the air from circulating within the discharge tube. As shown in FIG. 5, the laminar flow member is a generally cross-shaped baffle 210. However, it should be appreciated that other shapes are also contemplated. A portion of the baffle projects a predetermined distance from a lowermost end of each discharge guide tube into the interior of the second cyclone part. The cross-sectional area of the baffle at any point along its length can be generally cross-shaped.

The bottom guide plate 192 is spaced away from the top guide plate 190 by a generally continuous, peripheral barrier 212 extending upwardly from a wall 214. The barrier abuts against a bottom surface of wall 194 and flange 200 to define an air passage from the manifold air inlet section 194 to the second cyclone part 90.

With reference again to FIG. 5, the second cyclone part comprises a plurality of spaced apart, frusto-conical, downstream, second stage cyclonic separators 220. The downstream separators are arranged in parallel and are mounted radially on the air manifold 74 outside of the first cyclone part 88. In the depicted embodiment, the downstream separators project downwardly from the wall 214 of the bottom guide plate 192 such that uppermost end 222 of each downstream separator is located approximately in the same plane defined by the top wall 100 of the first stage separator 96. Each downstream separator 220 includes a dirty air inlet 224 in fluid communication with the air passage defined by the guide plates 190 and 192. In particular, the air passage is separated into a plurality of isolated air conduits 228 by a plurality of dividing walls 230 extending inwardly from the barrier 212. The dividing walls at least partially surround the dirty air inlet of each downstream separator. Each manifold air conduit 228 has an air outlet 234 which directs a volume of partially cleaned air generally tangentially into the inlet 224 of each second stage separator 220. This causes a vortex-type, cyclonic or swirling flow. Such vortex flow is directed downwardly in the downstream separator since a top end thereof is blocked by the bottom surface of wall 204. Each second stage or downstream separator 220 can have a dimensional relationship such that a diameter of its upper end is three times the diameter of its lower end. This relationship is seen to improve the efficiency of cyclonic separation. An outer cover 240 at least partially encases or surrounds the plurality of downstream separators 220. The outlet cover can be secured to the bottom guide plate 192 via conventional fasteners.

With reference again to FIG. 5, each downstream separator 220 includes a dust blocking member 250 having a connection member 252 and a dust blocking plate 254. The connecting member is mounted to a lower end 256 of each downstream separator 220. In this embodiment, an upper portion of the connecting member is integrally formed with the separator lower end; although, this is not required. The dust blocking plate 254 is attached to a lower portion of the connecting member so as to be spaced from a particle outlet 260 of the downstream separator by a predetermined distance. The blocking plate limits turbulence in the second dust collection chamber 84 attached to a lower portion of the outer cover 240 and prevents dirt that has fallen into the second dust collection chamber from becoming mixed into the cleaned air exiting each downstream separator. The lower end 256 of each second stage separator 220 and a bottom surface of the dust blocking plate 254 can be inclined at an acute angle of approximately fifteen degrees (15°) relative to a longitudinal axis of each separator. This configuration allows dirt to easily pass downwardly through the particle outlet 260 and into the second dust collection chamber 84 reducing risk of dirt collecting in the area of the particle outlet and causing a blockage.

The dirt separated by each downstream separator 220 is collected in the second dust collection chamber 84. With reference again to FIG. 7, operably secured to the dust collector 20 is a second closure member or bottom plate or lid 272, which allows for independent emptying of the second dust collection chamber 84. In the depicted embodiment, the bottom lid 272 is pivotally secured to a lower portion of a second wall 270 of the dirt cup 80; although, this is not required. Instead, the lid 272 could be indirectly secured to the dirt cup if so desired. A seal ring (not shown) can be fitted around the second bottom lid to create a seal between the second lid and the dirt cup. A second hinge assembly 274 can be used to mount the second bottom lid 270 to a bottom portion of the dirt cup. The second hinge assembly allows the second bottom lid to be independently selectively opened so that dirt and dust particles that were separated from the air stream by the downstream separators 220 can be emptied from the second dust collection chamber 84. A second latch assembly (not shown) can be located diametrically opposed from the second hinge assembly 274. Normally, the second latch assembly maintains the second bottom lid 270 in a closed position.

As indicated previously, each discharge guide tube 208 directs the cleaned air exhausted from the second cyclone part 90 into the cover unit 76 before being discharged to an inlet of the electric motor and fan assembly 16. As shown in FIG. 5, the cyclone cover 76 includes a bottom plenum 280 and a top plenum 282. The bottom plenum can be hinged to provide access to the second stage separators for cleaning. The bottom plenum collects a flow of cleaned air from the downstream separators 220 and directs the cleaned air through a two stage filter assembly 288 for filtering any remaining fine dust remaining in the airflow exiting the downstream separators. In this embodiment, the two stage filter element 288 includes at least one foam filter. Such a filter can be a compound member with a coarse foam layer 290 and a fine foam layer 292, at least partially housed in the bottom plenum 288. The two foam layers can, if desired, be secured to each other by conventional means. Located downstream therefrom can be a pleated filter 294, such as a High-Efficiency Particulate Arresting (HEPA) grade filter, housed in the top plenum 282. By housing the pleated filter in the cover unit 76, there is no need for an additional filter plenum and the foam filters are separated from the pleated filter. The two stage filter element 288 and the pleated filter 294 can both be easily serviced by removing the top plenum from the bottom plenum. For example, the top plenum can be pivotally mounted to the bottom plenum. This separation of the filters prevents transfer of dust from the two stage filter element to the pleated filter during service.

With reference to FIGS. 1 and 5, the top plenum 282 collects a flow of cleaned air from the filter assembly and merges the flow of cleaned air into a first cleaned air outlet conduit 300. The first outlet conduit has a first section 302 projecting radially from the cover unit and a downwardly projecting second section 304. A second cleaned air conduit 310 is attached to an end 312 of the first conduit. In this embodiment, the end 312 of the first conduit has an inner diameter greater than an outer diameter of a first end 314 of the second conduit such that the first end is frictionally received in the end 312. The second conduit has a longitudinal axis which is oriented approximately parallel to the longitudinal axis of the dust collector 20. An outlet end 320 of the second conduit is attached to the hose connector 62 of the motor housing 60 and is in fluid communication with the inlet of the electric motor and fan assembly 16.

In operation, dirt entrained air passes into the upstream, first cyclone separator 96 through the inlet 98 which is oriented tangentially with respect to the sidewall 102 of the separator. The air then travels around the separation chamber where many of the particles entrained in the air are caused, by centrifugal force, to travel along the interior surface of the sidewall of the separator 96 and drop out of the rotating air flow by gravity. However, relatively light, fine dust is less subject to a centrifugal force. Accordingly, fine dust may be contained in the airflow circulating near the bottom portion of the dirt cup. Since the cross blade 176 extends into the bottom portion of the first dust collection chamber 82 of the dirt cup 80, the circulating airflow hits the blade assembly and further rotation is stopped, thereby forming a laminar flow. In addition, if desired, extending inwardly from a bottom portion of the wall 94 of the first dust collection chamber 82 can be laminar flow members (not visible) which further prevent the rotation of air in the bottom of the dirt cup. As a result, the most of the fine dust entrained in the air is also allowed to drop out.

The partially cleaned air travels through the openings 144 of the perforated tube 140. The partially cleaned air then travels through the air manifold 74 mounted above the perforated tube and into the frusto-conical downstream cyclonic separators 220. There, the air cyclones or spirals down the inner surfaces of the cyclonic separators before moving upward through the discharge guide tubes 208 and into the cover unit 76. The baffle 210 causes the air flowing through each discharge guide tube to be a laminar flow. Fine dirt separated in the downstream cyclonic separators collects in the second dust collection chamber 84. The cleaned air flows out of the downstream separators into the bottom plenum 280, through the filter assembly 288, into the upper plenum 282 and into the first and second conduits 300, 310, respectively. It will be appreciated that the volume of the bottom plenum before the foam filter can be generally the same as the volume of the upper plenum after the pleated filter. The conduits are in fluid communication with the air inlet to the electric motor and fan assembly 16.

To empty the dirt collected in the first dust collection chamber, the first bottom lid 130 can be opened. To empty the dirt collected in the second collection chamber, the second bottom lid 270 can be opened, independent of the first bottom lid. Each bottom lid 130 and 270 can include a device to delay the opening of the bottom lid and/or moderate movement of the bottom lid, causing the bottom lid, on release from its closed position, to be opened smoothly yet steadily and slowly. This delayed or slowed movement retards the reintroduction of the dirt collected in each collection chamber 82, 84 into ambient air. The device can include conventional damping devices, such as a spring, piston and the like, and/or a mechanism integrated in each bottom lid or the dirt cup 80. It should also be appreciated that the bottom lids can be configured such that the second bottom lid can not be opened until the first bottom lid is opened. For example, this can be accomplished by any known type of mechanical interlock of the two lids.

Similar to the aforementioned embodiment, a second embodiment of a dust collector for a dual stage cyclone vacuum cleaner is shown in FIGS. 8-17. Since most of the structure and function is substantially identical, reference numerals with a single primed suffix (') refer to like components (e.g., vacuum cleaner 10 is referred to by reference numeral 10'), and new numerals identify new components in the additional embodiment.

With reference now to FIGS. 8-12, a dust collector 402 for the dual stage cyclone vacuum cleaner 10' includes a cyclone main body 404, an air manifold 406 and cover unit 408 attached to an upper portion of the cyclone main body, and a dirt cup 410 connected with the cyclone main body. The dirt cup includes a first dust collection chamber 412 and a second dust collection chamber 414. The cyclone main body 404 includes a first cyclone part or first cyclonic stage 418 and a second cyclone part or second cyclonic stage 420. Similar to the previous embodiment, the first and second dust collection chambers are configured to independently store and empty dirt and dust particles separated by the respective first and second cyclone parts.

Figure 9:
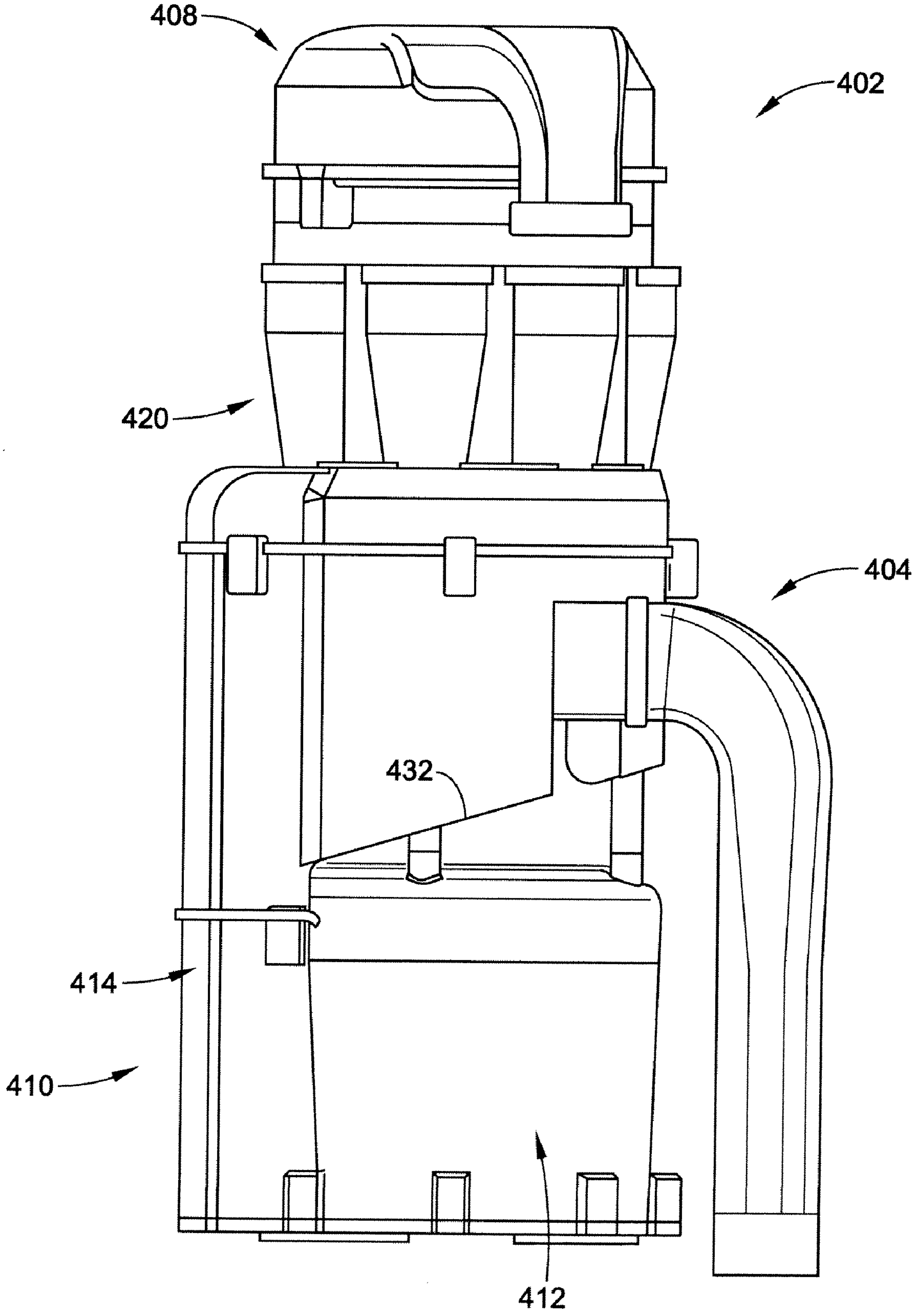
FIG. 9 is an enlarged left side elevational view of the assembled dust collector of FIG. 8.
Figure 10:
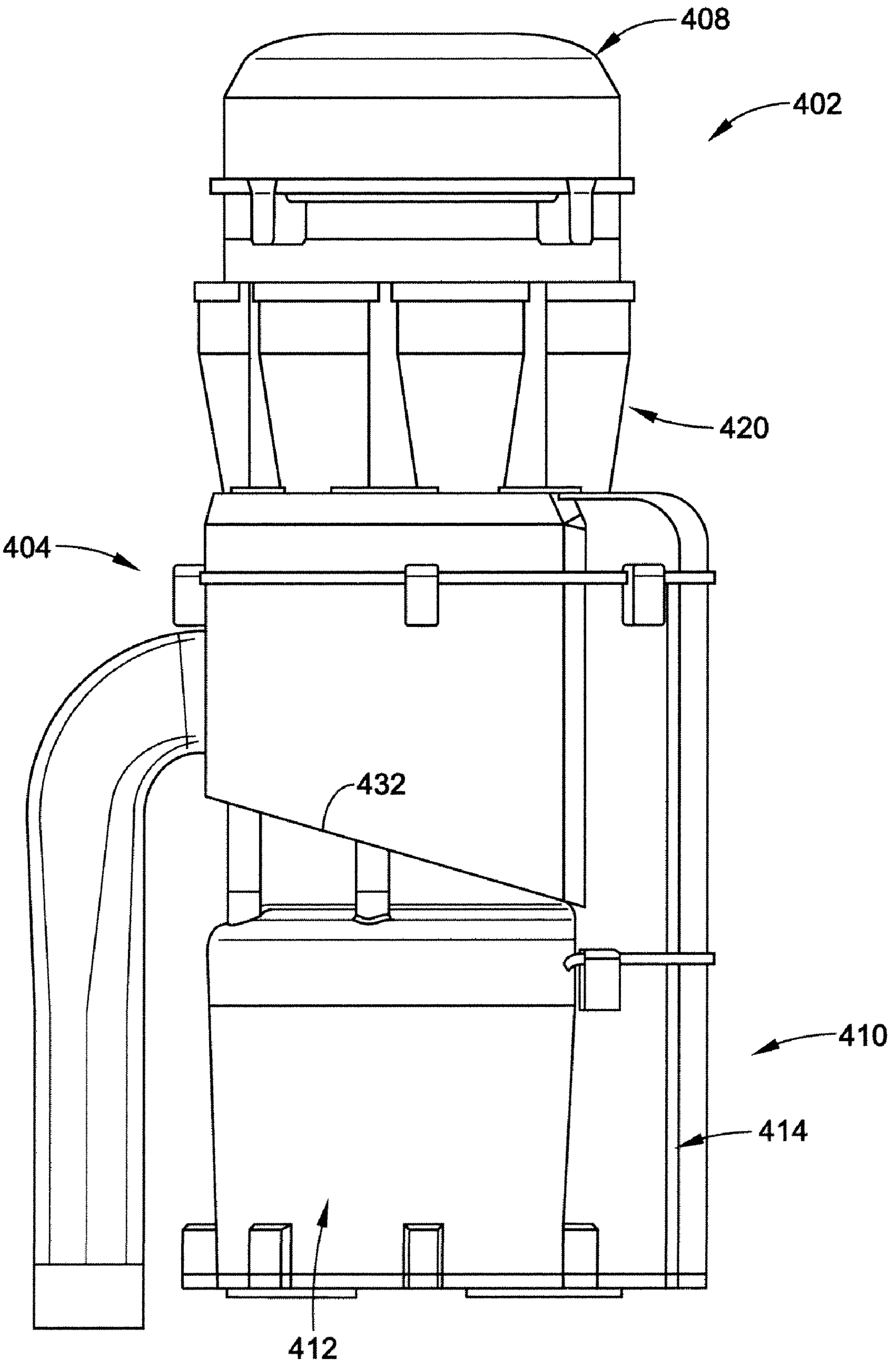
FIG. 10 is a right side elevational view of the assembled dust collector of FIG. 9.
Figure 11:
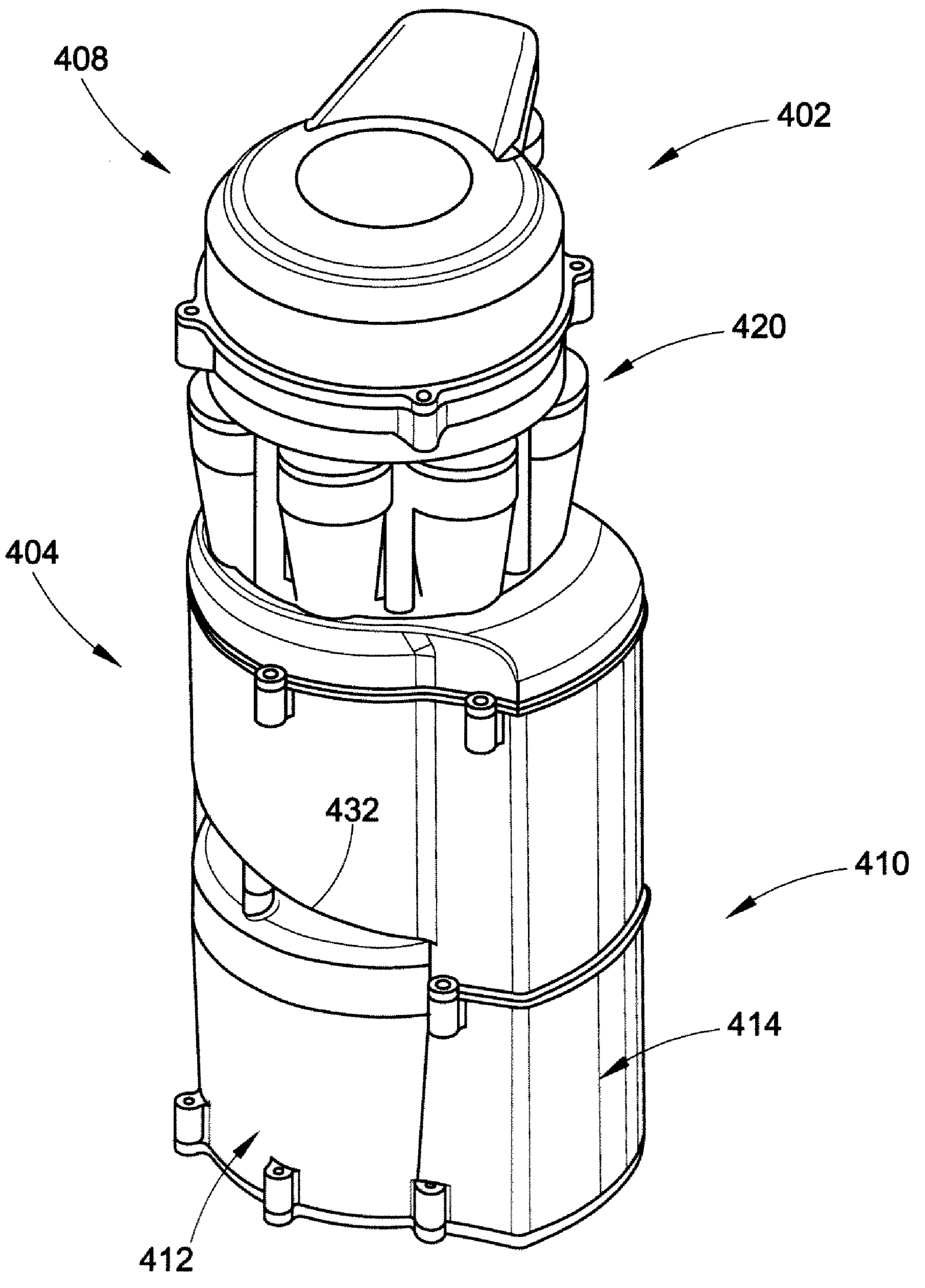
FIG. 11 is a rear perspective view of the assembled dust collector of FIG. 9.
Figure 12:
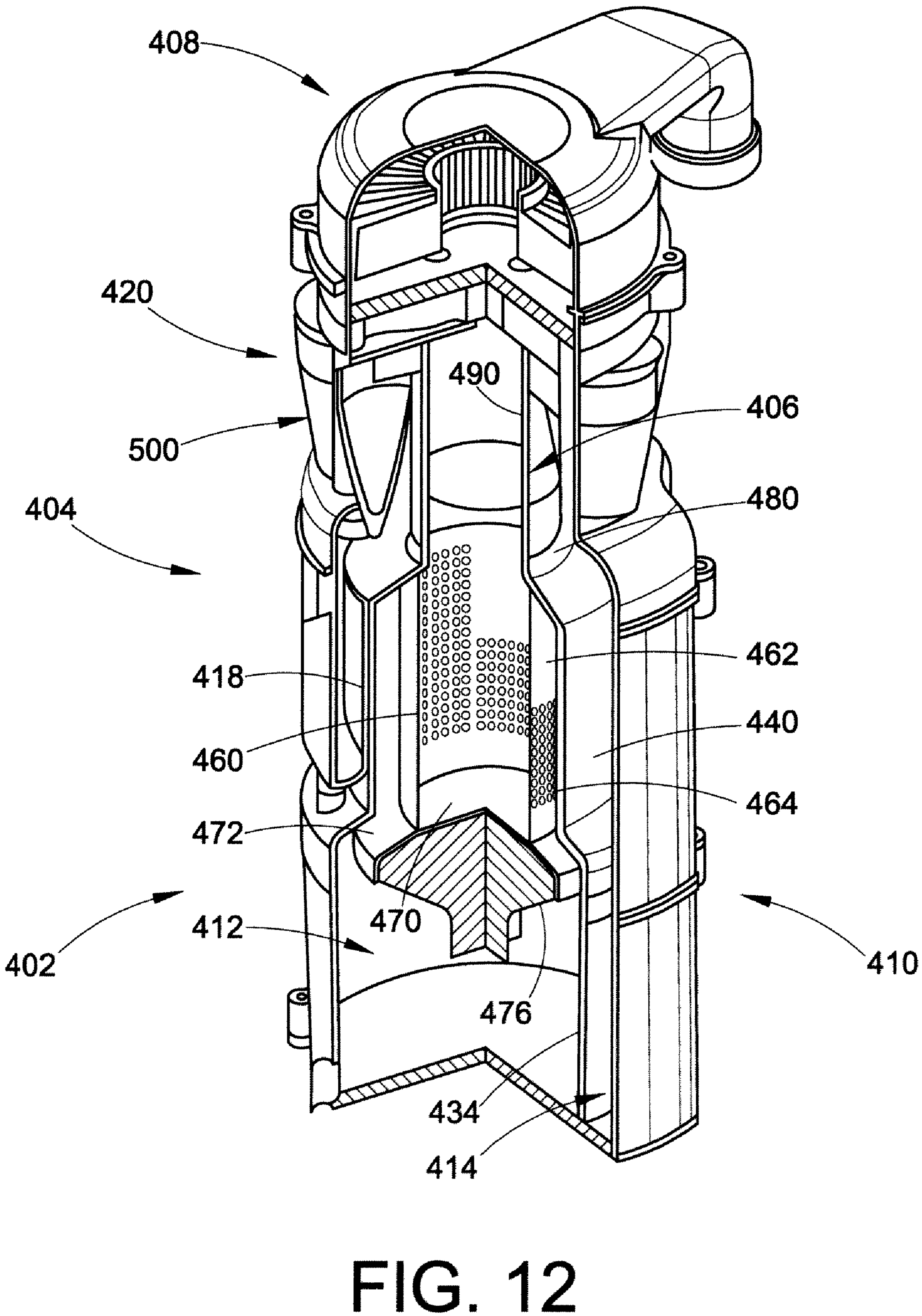
FIG. 12 is a cross-sectional of the assembled dust collector of FIG. 11.
Figure 13:
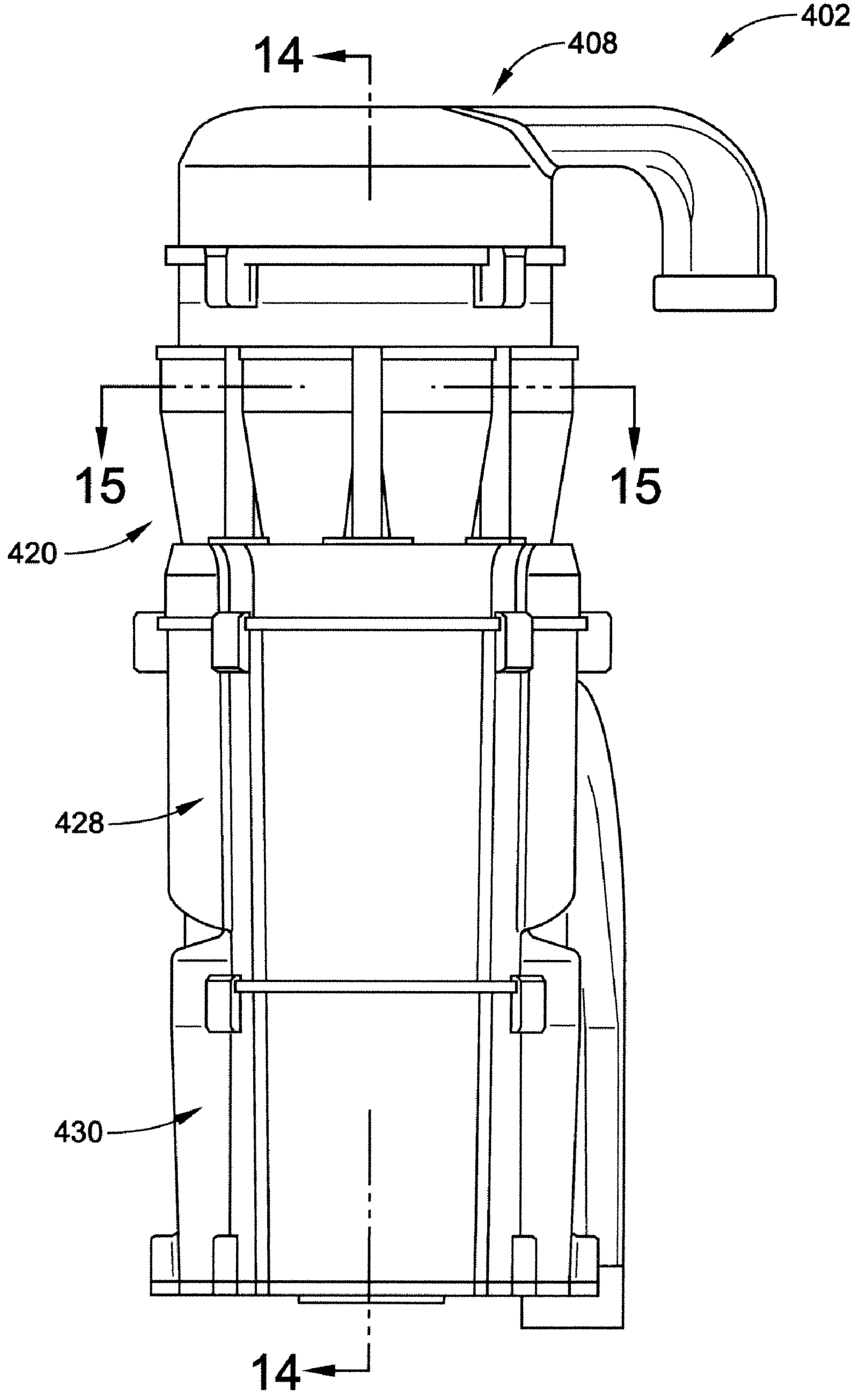
FIG. 13 is a rear elevational view of the assembled dust collector of FIG. 9.

As shown in FIGS. 12 and 13, the second dust collection chamber 414 includes an upper collection section 428 in communication with a lower collection section 430. The upper collection section generally surrounds an upper portion of the first cyclone part 418. As shown in FIGS. 9-11, a bottom portion 432 of the upper collection section 428 is tapered to promote sliding and transferring of remaining dust particles separated by the second cyclone part 420 from the upper collection section 428 into the lower collection section 430. The lower collection section extends outwardly from a sidewall 434 of the first dust collection chamber 412. Thus, the first and second dust collection chambers are completely separated from each other such that the airflow in one of the chambers does not affect the airflow in the other of the chambers. This further improves the dust collection efficiency of the dust collector 402. In the depicted embodiment, a portion of the upper collection section 428, which is in communication with the lower collection section 430, and the lower collection section are generally box-like; although, this is not required. Alternative conformations are also contemplated.

Figure 14:
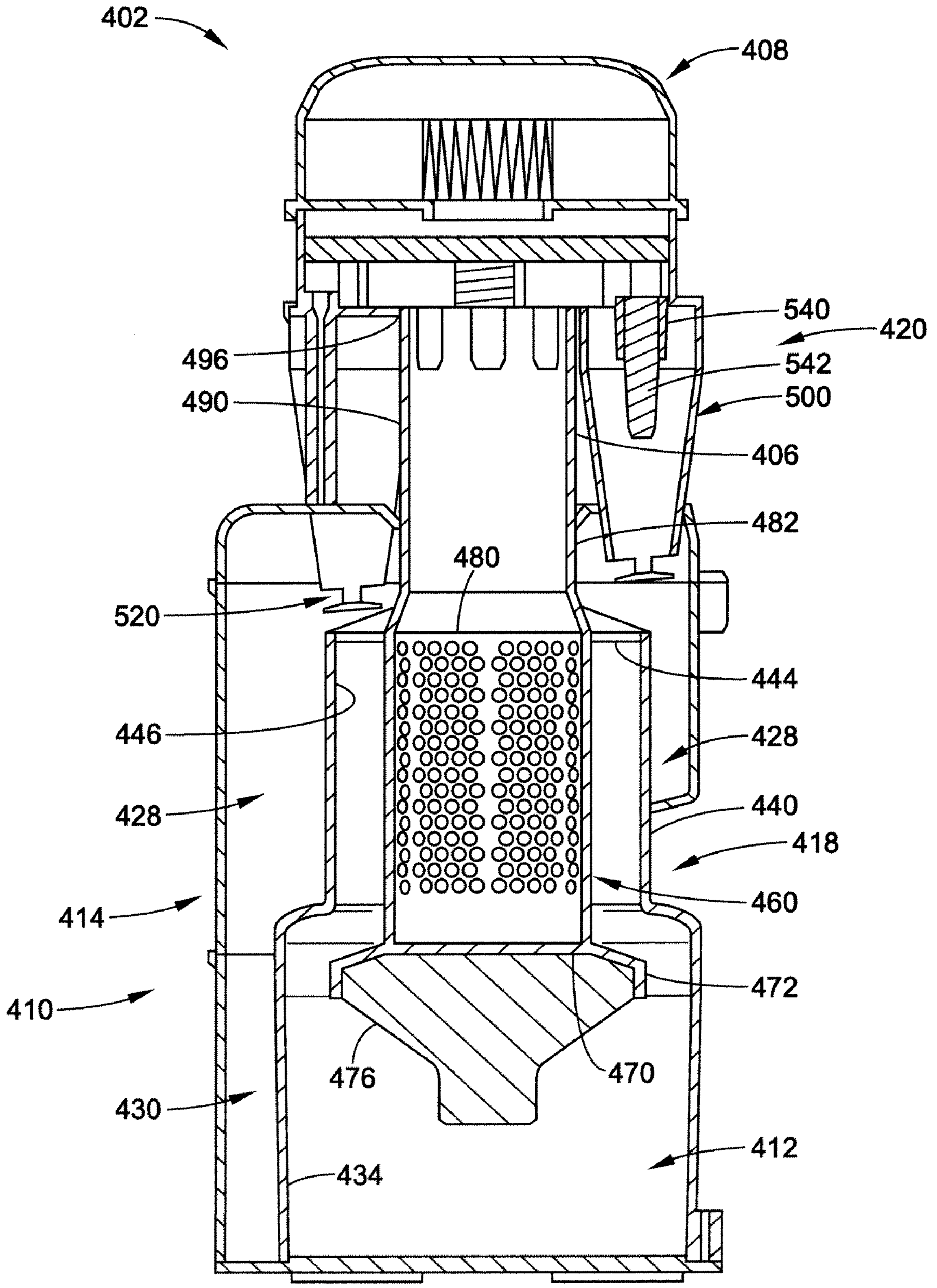
FIG. 14 is a cross-section view taken generally along section lines 14-14 of the assembled dust collector of FIG. 13.

With reference again to FIG. 8, and additional reference to FIG. 14, the first cyclone part 418 comprises a generally cylindrical shaped first stage cyclone separator 440. However, it should be appreciated that the first cyclone part can comprise a generally frusto-conical shaped first stage cyclone separator. The first stage separator includes a dirty air inlet conduit 442, a top wall 444 and a sidewall 446 having an outer surface and an inner surface. The outer surface of the sidewall can form at least a part of an external surface of the vacuum cleaner 10'. The airflow into the first stage separator 440 is tangential which causes a vortex-type, cyclonic or swirling flow. Such vortex flow is directed downwardly in the first stage separator by the top wall 444. Cyclonic action in the first stage separator removes a substantial portion of the entrained dust and dirt from the suction air stream and causes the dust and dirt to be deposited in the first dust collection chamber 412 of the dirt cup 410.

Figure 16:
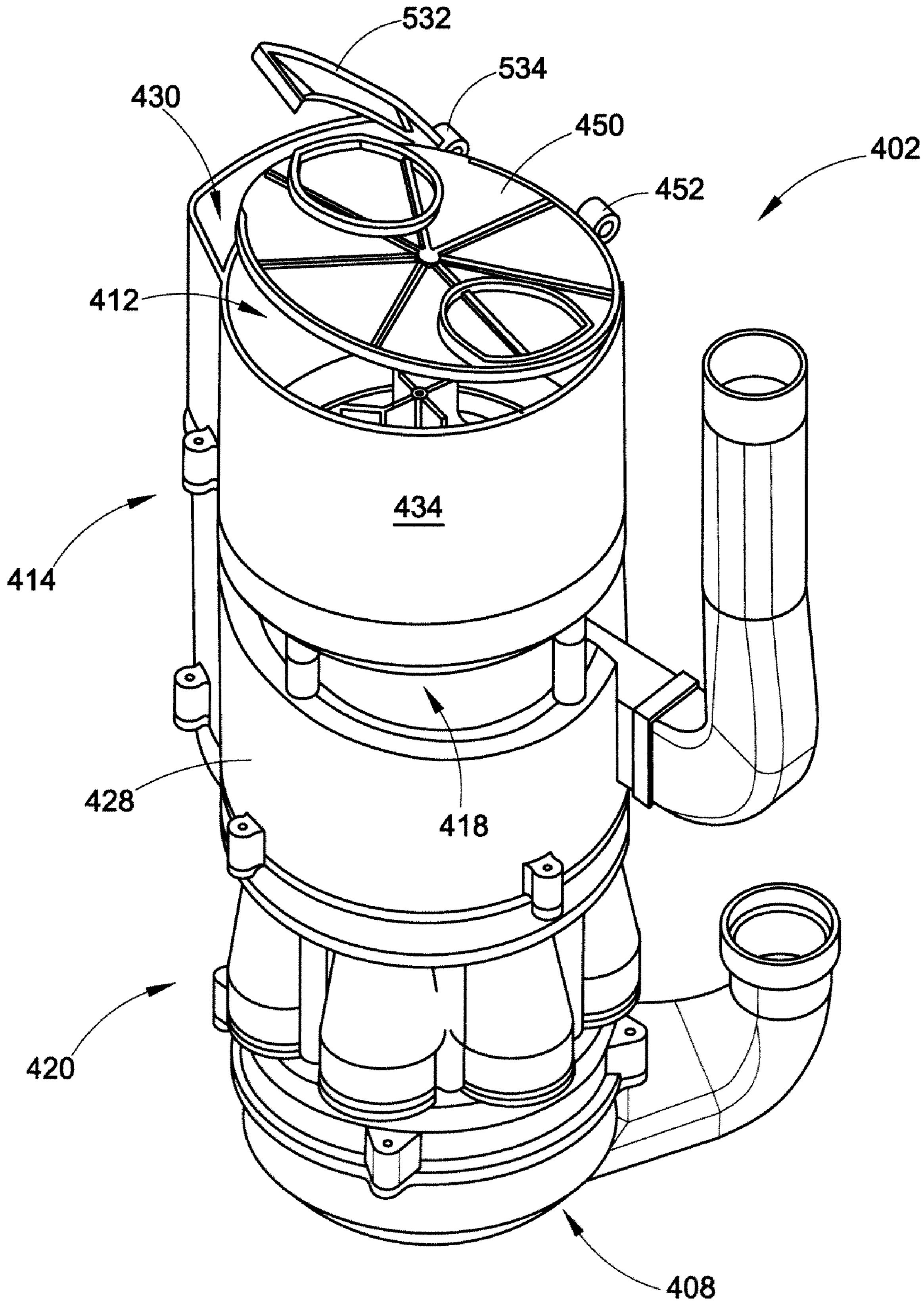
FIGS. 16 and 17 are enlarged bottom perspective views of the dust collector of FIGS. 9 and 10, respectively, showing a first bottom lid for a first dust cup and a second bottom lid for a second dust cup, with both lids in an open position.
Figure 17:
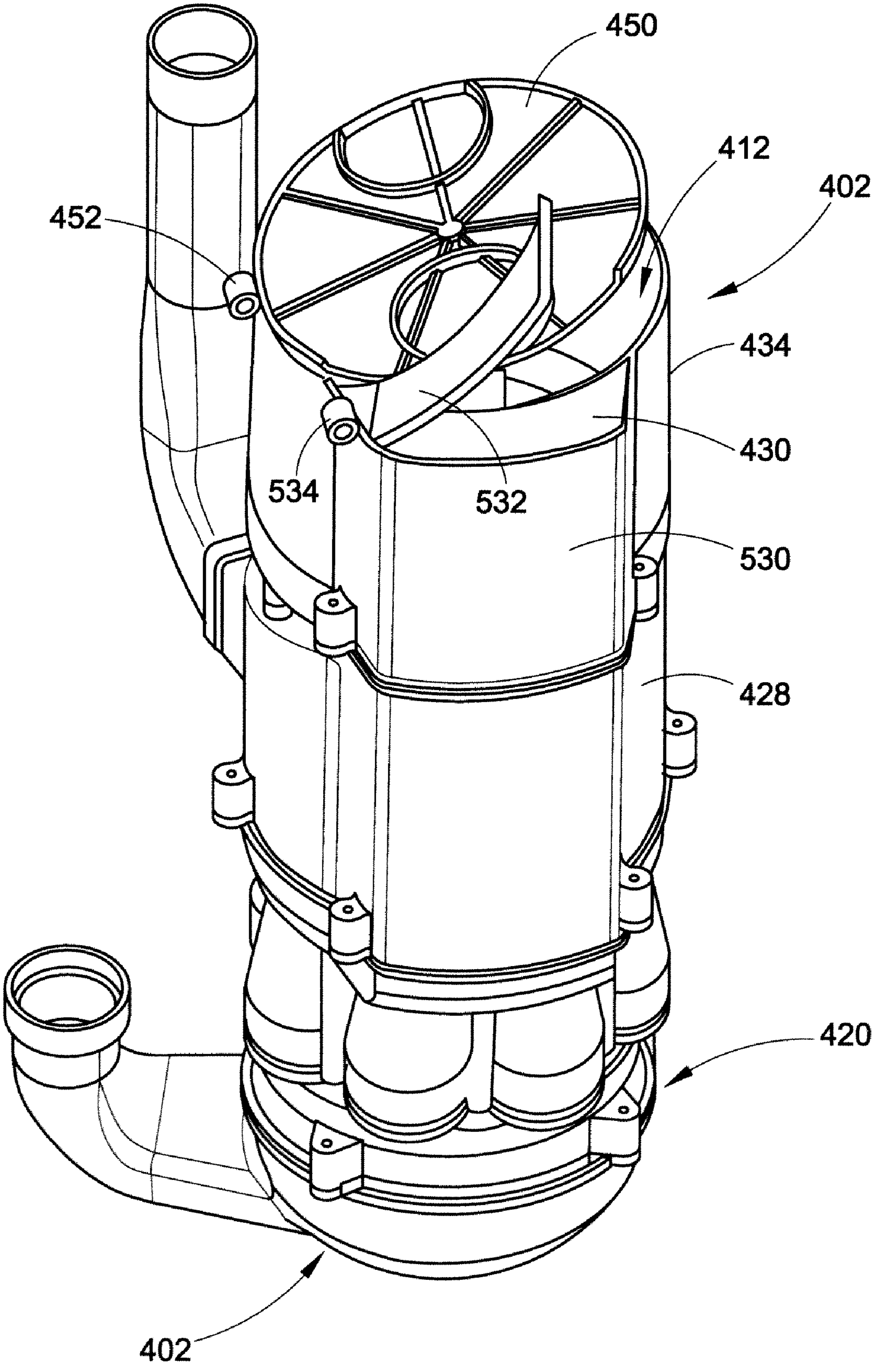

With reference to FIGS. 16 and 17, pivotally secured to a lower portion of the wall 434 of the first dust collection chamber 412 is a first bottom plate or lid 450, which allows for emptying of the first dust collection chamber 412. A seal ring (not shown) can be fitted around the first bottom lid to create a seal between the first lid and the dirt cup. A first hinge assembly 452 can be used to mount the first bottom lid 450 to a bottom portion of the dirt cup 410. The first hinge assembly allows the first bottom lid to be selectively opened so that dirt and dust particles that were separated from the air stream by the first stage separator 440 can be emptied from the first dust collection chamber 412. A first conventional latch assembly (not shown), which can be located diametrically opposed from the first hinge assembly 452, normally maintains the first bottom lid 450 in a closed position.

Similar to the previous embodiment, and with reference to FIGS. 12 and 14, fluidly connecting the first cyclone part 418 to the second cyclone part 420 is a perforated tube 460. The perforated tube is disposed within the first stage separator 440 and extends longitudinally therein. The perforated tube includes a generally cylindrical section 462 including a plurality of openings or perforations 464 located around a portion of the circumference of the cylindrical section. The openings 464 serve as an outlet from the first stage separator 440, allowing the partially cleaned fluid to enter the second cyclone part 420. The perforated tube 460 can also include at least one internally mounted fin to eliminate cyclonic flow inside the perforated tube.

Connected to a lower, closed end 470 of the perforated tube is a shroud 472 for retarding an upward flow of dirt and dust particles that have fallen below the first stage separator 440. A laminar flow member, such as one or more baffles or fins 476, is mounted to the closed lower end 470 of the perforated tube 460. At least a portion of the laminar flow member is encircled by the shroud 472. With reference again to FIGS. 12 and 14, an upper end or air outlet 480 of the perforated tube 460 is in fluid communication with an air inlet section 482 of the air manifold 406 positioned above the first stage separator 440. In the depicted embodiment, the air inlet section 482 has a varying dimension. Specifically, the air inlet section includes a first, lower end connected to the air outlet 480 of the perforated tube 460 and a second, upper end connected to an air outlet section 490 of the air manifold 406. The air inlet section first end has a first dimension and the air inlet section second end has a smaller second dimension. This decreasing cross-sectional area allows the air stream to be drawn into the perforated tube 460 by way of the venturi effect, which increases the velocity of the air stream flowing through the perforated tube and creates an increased vacuum in the openings 464. Alternatively, the air inlet section can have a constant longitudinal dimension approximately equal to a dimension of the cylindrical section of the perforated tube (i.e., a diameter of the air inlet section is approximately equal to a diameter of the perforated tube).

As shown in FIG. 14, the air manifold 406 includes the air inlet section 482, the air outlet section 490 and an air guide 494 provided under the cover unit 408. Both the air inlet section and the air outlet section have a longitudinal axis coincident with the longitudinal axis of the perforated tube 460. The air guide includes an opening 496 dimensioned to receive a portion of the air outlet section 490. As will be described in greater detail below, the air guide further includes an air passage in fluid communication with the air outlet section for directing partially cleaned air from the perforated tube 460 to the second cyclone part 420.

Figure 15:
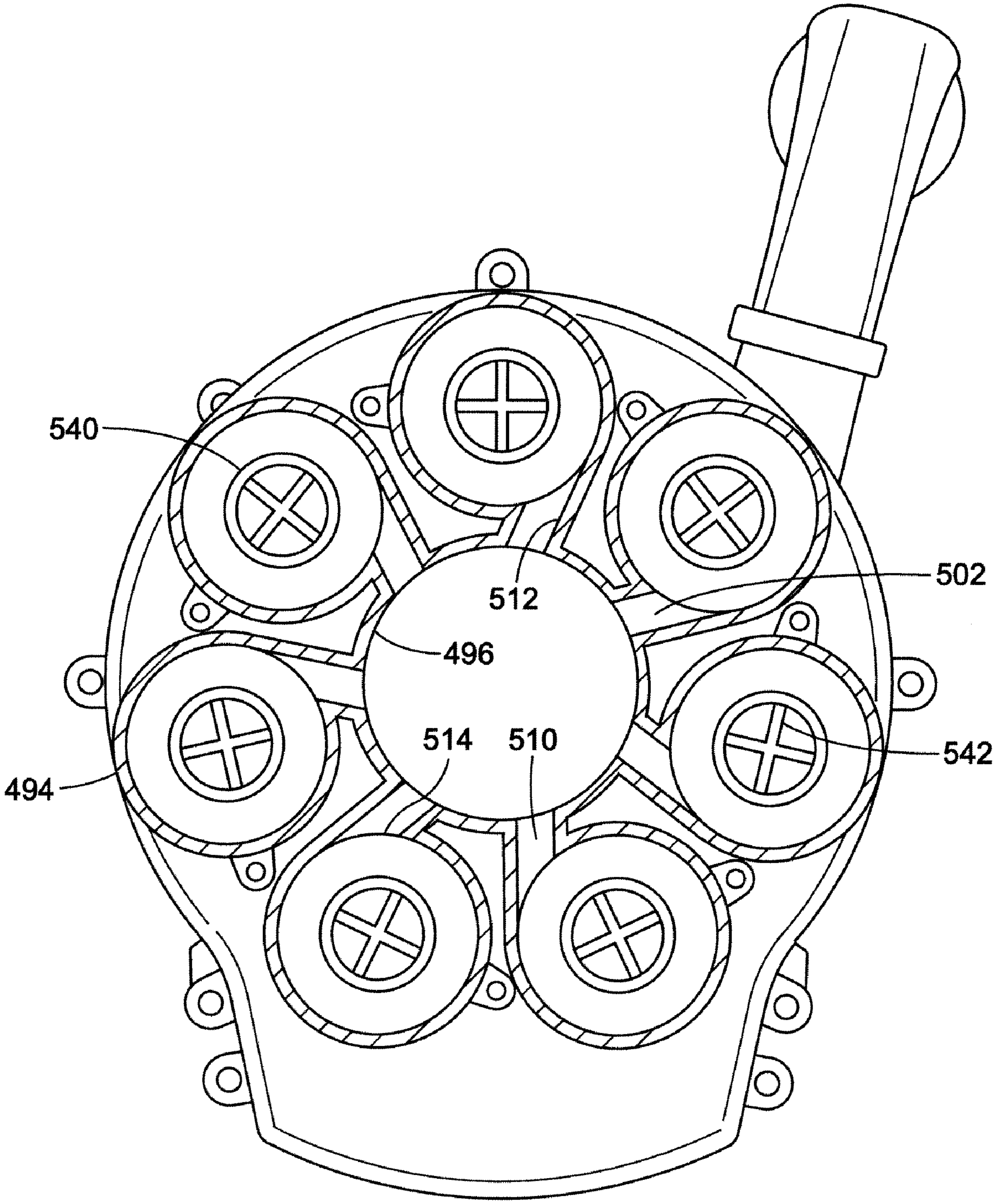
FIG. 15 is a reduced cross-section view taken generally along section lines 15-15 of the assembled dust collector of FIG. 13.

With reference again to FIGS. 12 and 14, and similar to the previous embodiment, the second cyclone part 420 comprises a plurality of spaced apart, frusto-conical, downstream, second stage cyclonic separators 500. The downstream separators are arranged in parallel and are mounted radially on the air manifold 406 above of the first cyclone part 418. The separators project downwardly from the air guide 494 at least partially into the upper collection section 428 of the second dust collection chamber 414. As shown in FIG. 15, each downstream separator 500 includes a dirty air inlet 502 in fluid communication with the air passage defined by the air guide 494. In particular, the air passage is separated into a plurality of isolated air conduits 510, which extend from the opening 496, by a plurality of dividing walls 512. The dividing walls at least partially surround the dirty air inlet of each downstream separator. Each manifold air conduit 510 has an air outlet 514 which directs a volume of partially cleaned air generally tangentially into the inlet 502 of each second stage separator 500. This causes a vortex-type, cyclonic or swirling flow. Such vortex flow is directed downwardly in the downstream separator since a top end thereof is blocked by the air guide 494. An outer cover (not visible), which can be secured to the dust collector 402, can at least partially encase or surround the plurality of downstream separators 500.

With reference again to FIG. 14, each downstream separator 500 includes a dust blocking member 520 which limits turbulence in the second dust collection chamber 414 and prevents re-entrapment of dirt that has fallen into the second dust collection chamber into the cleaned air exiting each downstream separator.

The dirt separated by each downstream separator 200 is collected in the second dust collection chamber 414. With reference again to FIGS. 16 and 17, pivotally secured to a lower portion of a wall 530 of the second dust collection chamber 414 is a second bottom plate or lid 532, which allows for independent emptying of the second dust collection chamber. Again, a seal ring (not shown) can be fitted around the second bottom lid to create a seal between the second lid and the dirt cup. A second hinge assembly 534 can be used to mount the second bottom lid 532 to a bottom portion of the dirt cup. The second hinge assembly allows the second bottom lid to be independently selectively opened so that remaining dirt and dust particles that were separated from the air stream by the downstream separators 500 can be emptied from the second dust collection chamber 84. A second latch assembly, which can be located diametrically opposed from the second hinge assembly 534, normally maintains the second bottom lid 532 in a closed position.

As shown in FIGS. 14 and 15, located on the air guide 494 and projecting downwardly therefrom is a plurality of discharge guide tubes 540. The discharge guide tubes direct clean air exhausted from the second cyclone part 420 into the cover unit 408 before being discharged to an inlet of the electric motor and fan assembly 16'. Each discharge guide tube 250 can include a laminar flow member, such as a generally cross-shaped baffle 542, to stop the air from circulating within the discharge tube.

As to a further discussion of the structure, manner of usage and operation of the second embodiment, the same should be apparent from the above description relative to the first embodiment. Accordingly, no further discussion relating to the manner of usage and operation will be provided.

Figure 18:
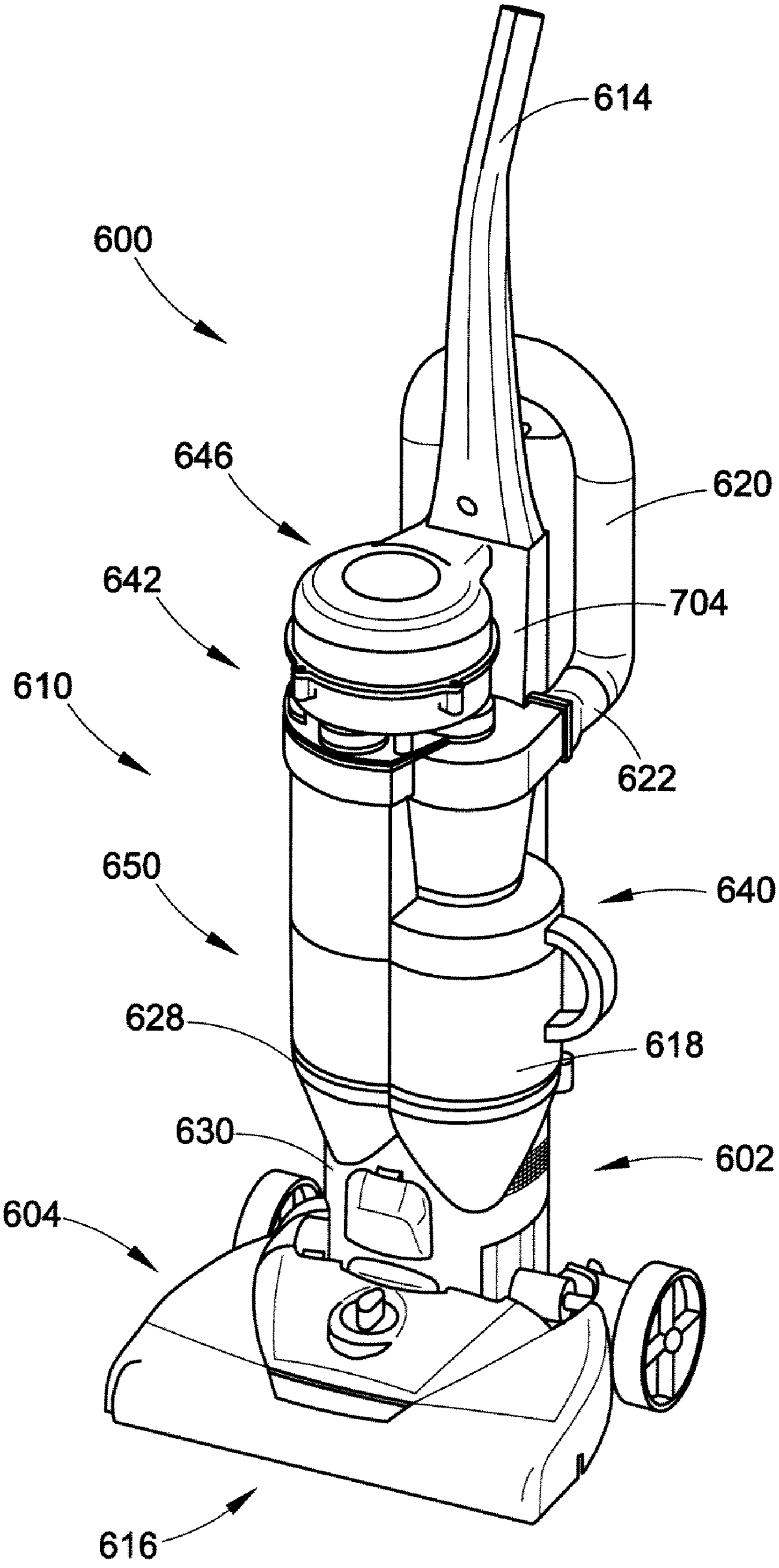
FIG. 18 is a front perspective view illustrating a dual stage cyclone vacuum cleaner including an assembled dust collector in accordance with a third embodiment of the present invention.
Figure 19:
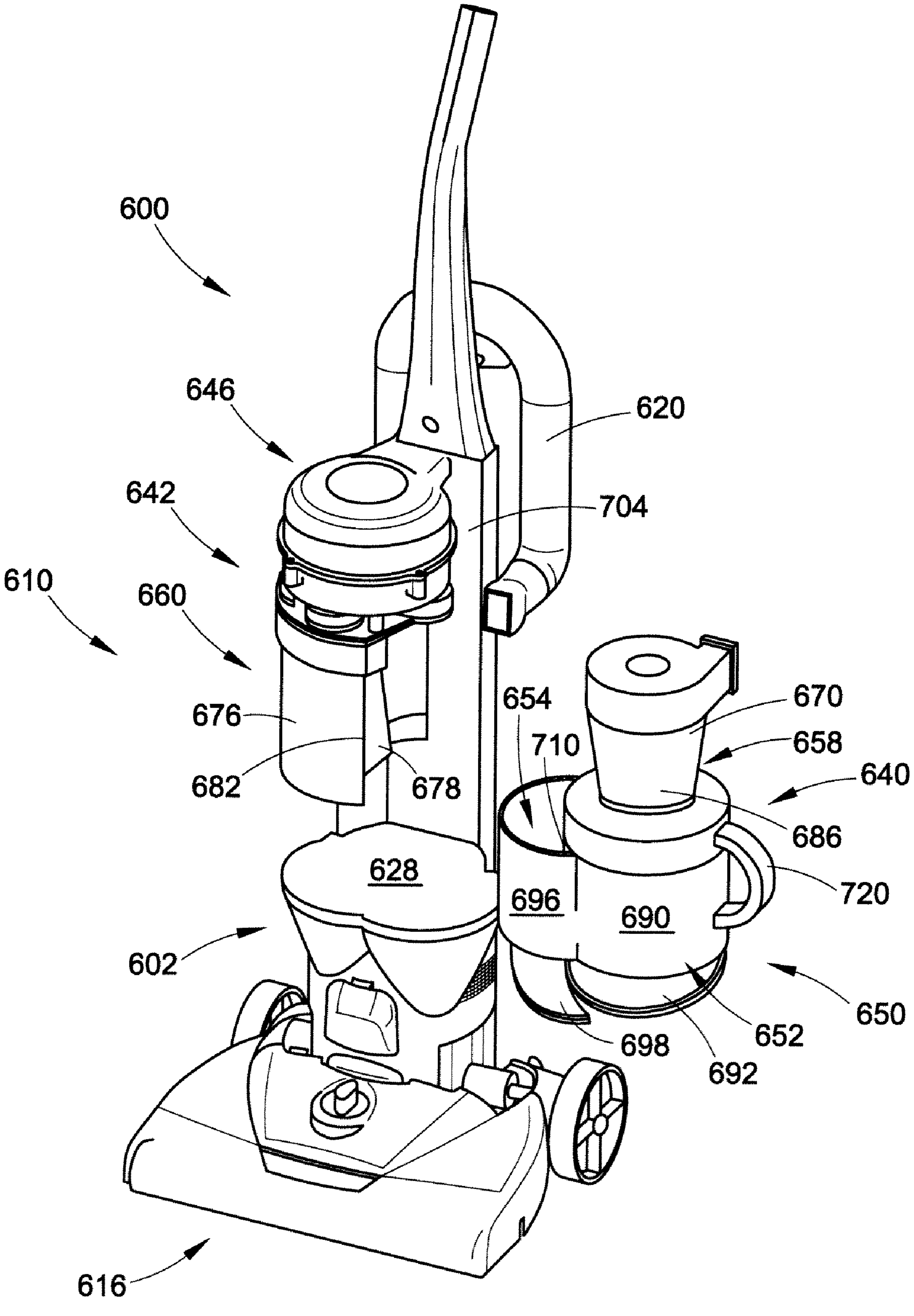
FIG. 19 is a front perspective view of the dual stage vacuum cleaner of FIG. 18 showing a first separator, a first dirt cup and a second dirt cup of the dust collector detached from the assembled dust collector.

Similar to the aforementioned embodiments, a third embodiment of a dual stage cyclone vacuum cleaner and a dust collector are shown in FIGS. 18 and 19.

With reference to FIG. 18, an upright dual stage vacuum cleaner 600 generally includes an electric motor and fan assembly 602, a nozzle base 604, and a housing 610 pivotally or hingedly mounted atop the nozzle base via conventional means. A handle 614 extends upward from the housing, by which an operator of the dual stage cyclone vacuum cleaner is able to grasp and maneuver the vacuum cleaner. An underside of the nozzle base includes a main suction opening 616 formed therein, which is in fluid communication with a dust collector 618 through a conduit 620. A section 622 of the conduit directs dust-laden air tangentially into the dust collector. A base member 628 of the housing 610 can be mounted to a motor housing 630 of the electric motor and fan assembly 602 for releasably supporting the dust collector 618. A latch assembly (not shown) can be mounted to the base member 628 for releasably securing the dust collector thereto.

With reference to FIG. 19, the housing 610 includes a cyclone main body 640, an air manifold 642 and cover unit 646 attached to an upper portion of the cyclone main body, and a dirt cup 650 connected with a lower portion of the cyclone main body. The dirt cup includes a first dust collection chamber 652 and a second dust collection chamber 654. The cyclone main body 640 includes a first cyclone part 658 and a separate second cyclone part 660. The first cyclone part comprises a generally frusto-conical shaped first stage cyclone separator 670 mounted atop the first dust collection chamber 652. The second cyclone part comprises a plurality of spaced apart, frusto-conical, downstream, second stage cyclonic separators (not visible) arranged in parallel and mounted radially on the air manifold 642 outside of the first cyclone part 658. An outer cover 676, which is releasably mounted atop the second dust collection chamber 654, at least partially encases or surrounds the plurality of downstream separators. A flange 678 extends inwardly from an end 682 of the outer cover and sealingly abuts an outer surface of a sidewall 686 of the first cyclone part.

Similar to the previous embodiments, the first and second dust collection chambers 652, 654 are configured to independently store and empty dirt and dust particles separated by the respective first and second cyclone parts 658, 660. Pivotally secured to a lower portion of a sidewall 690 of the first collection chamber 652 is a first bottom plate or lid 692. Pivotally secured to a lower portion of a sidewall 696 of the second collection chamber 654 is a second bottom plate or lid 698. Each bottom lid can be separately opened which allows for independent emptying of its respective dust collection chamber. A single compound hinge assembly (not visible) or separate hinge assemblies (not visible) can be used to mount the bottom lids to a bottom portion of the dirt cup.

As discussed above with respect to the operation of the previous embodiment, the first cyclone part separates dust from dust-laden air and the second cyclone part separates remaining dust particles from the air. As such, the first collection chamber 652 requires emptying more frequently than the second collection chamber 654. The dirt-laden air is exhausted from the second cyclone part 660 into the cover unit 646 before being discharged through a cleaned air conduit 704 to an inlet (not visible) of the electric motor and fan assembly 602.

With continued reference to FIG. 19, the first cyclone part 658, the first dust collection chamber 652 and the second dust collection chamber 654 can be selectively detached from the dust collector 610. The second cyclone part 660 remains removably mounted to the dust collector, which again can also be selectively detached from the vacuum cleaner 600. In this version, a common wall is shared by the collection chambers. Specifically, sidewall 696, which can be integrally formed with sidewall 690, extends outwardly from sidewall 690. An inner wall 710 acts as a barrier between the first and second dust collection chambers 652 and 654. A handle 720 can be attached to one of the first cyclone part and the first dust collection chamber to aid in the removal and subsequent handling of the detached unit.

Figure 20:
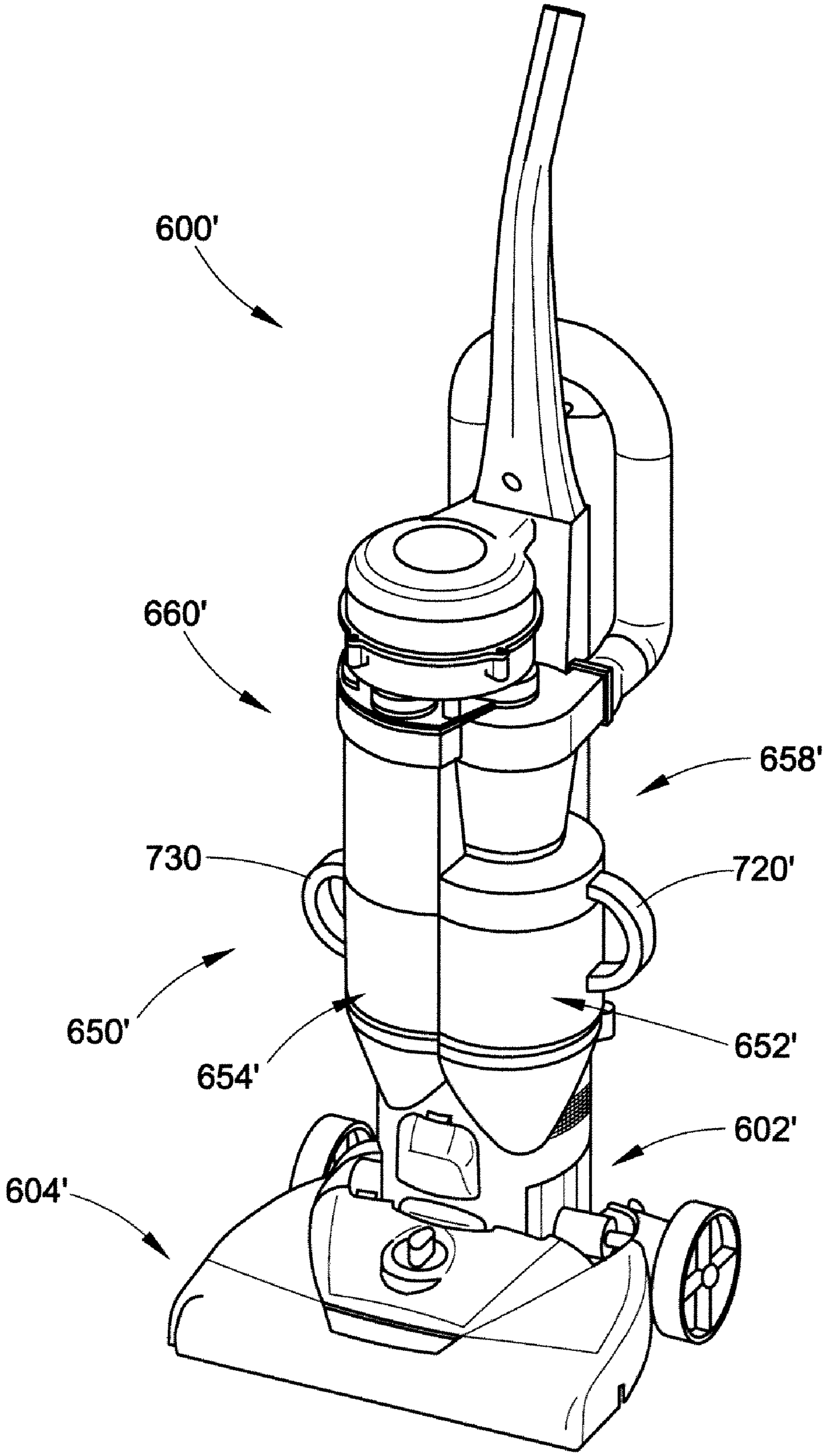
FIG. 20 is a front perspective view illustrating the dual stage cyclone vacuum cleaner of FIG. 18 including an assembled dust collector in accordance with a fourth embodiment of the present invention.
Figure 21:
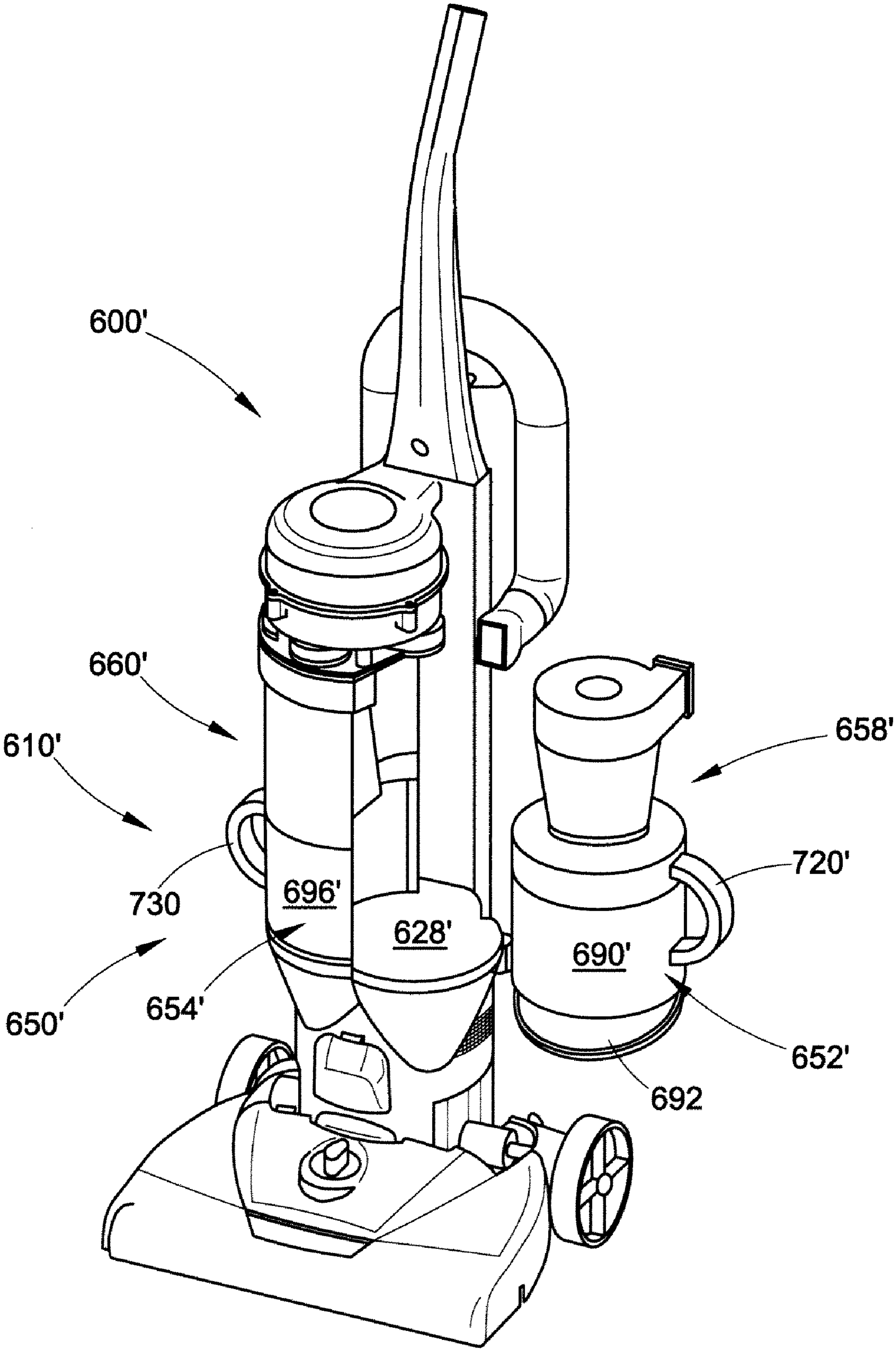
FIG. 21 is a front perspective view of the dual stage vacuum cleaner of FIG. 20 showing a first separator and a first dirt cup detached from the assembled dust collector.
Figure 22:
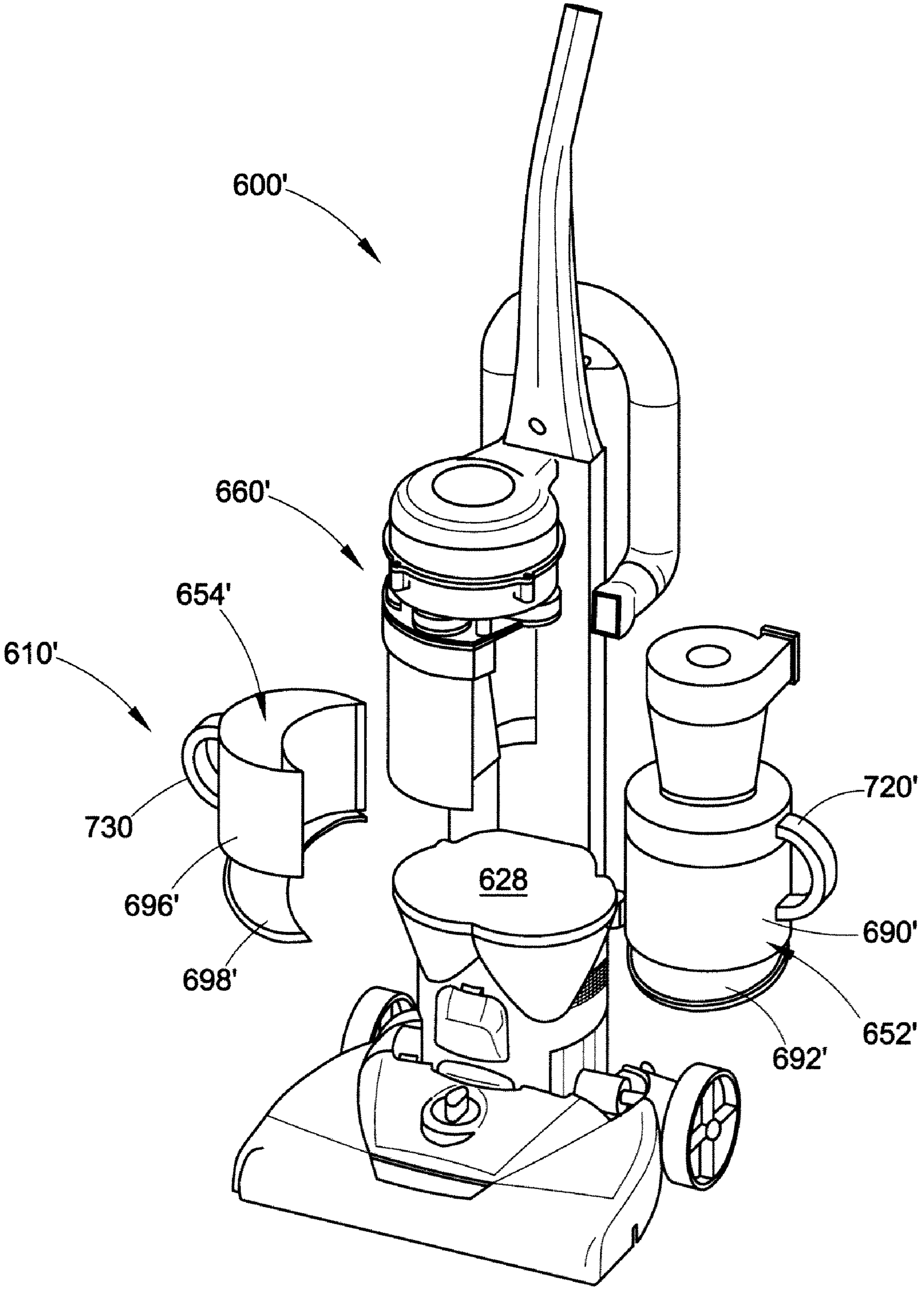
FIG. 22 is a front perspective view of the dual stage vacuum cleaner of FIG. 21 showing both the first dirt cup and second dirt cup separately detached from the assembled dust collector.

Similar to the third embodiment, a fourth embodiment of a dust collector for a dual stage cyclone vacuum cleaner is shown in FIGS. 20-22. Since most of the structure and function of the fourth embodiment is substantially identical to the third embodiment, reference numerals with a single primed suffix (') refer to like components (e.g., vacuum cleaner 600 is referred to by reference numeral 600'), and new numerals identify new components in the additional embodiment.

With reference to FIG. 21, the first cyclone part 658' and the first dust collection chamber 652' can be selectively detached from the housing 610'. The second cyclone part 660' and the second dust collection chamber 654' can remain removably mounted to the housing. In this embodiment, no common wall is shared by the collection chambers, each sidewall 690' and 696' enclosing its respective dust collection chamber 652' and 654'. Because the first collection chamber 652' requires emptying more frequently than the second collection chamber 654', the first dust collection chamber can be detached for cleaning without removing the second dust collection chamber. This minimizes the amount of fine dust introduced into ambient air during servicing of the vacuum cleaner.

With reference to FIG. 22, the second collection chamber 654' can also be independently detached from the housing 610' to empty the collected fine dust. Particularly, the second collection chamber is detached from the outer cover 676', the second cyclone part remaining removably mounted to the housing. A second handle 730 can be attached to the second dust collection chamber to aid in the removal and subsequent handling of the detached unit.

In this embodiment of the housing 610', separate hinge assemblies (not visible) can be used to mount the bottom opening lids 692' and 698' of the respective first and second dust collection chambers 652' and 654'. Additionally, in the above embodiments, the first and second dust collection chambers are completely separated from each other such that the airflow in one of the chambers does not affect the airflow in the other of the chambers, thereby improving the dust collection efficiency of the dust collector. It should be noted that one or both of the cyclonic stages 658' and 660' can be detached from the housing 610'. Also, each of the dust collection chambers 652' and 654' can be detached from the housing.

As to a further discussion of the manner of usage and operation of the third and fourth embodiments, the same should be apparent from the above description relative to the first embodiment. Accordingly, no further discussion relating to the manner of usage and operation will be provided.

Figure 24:
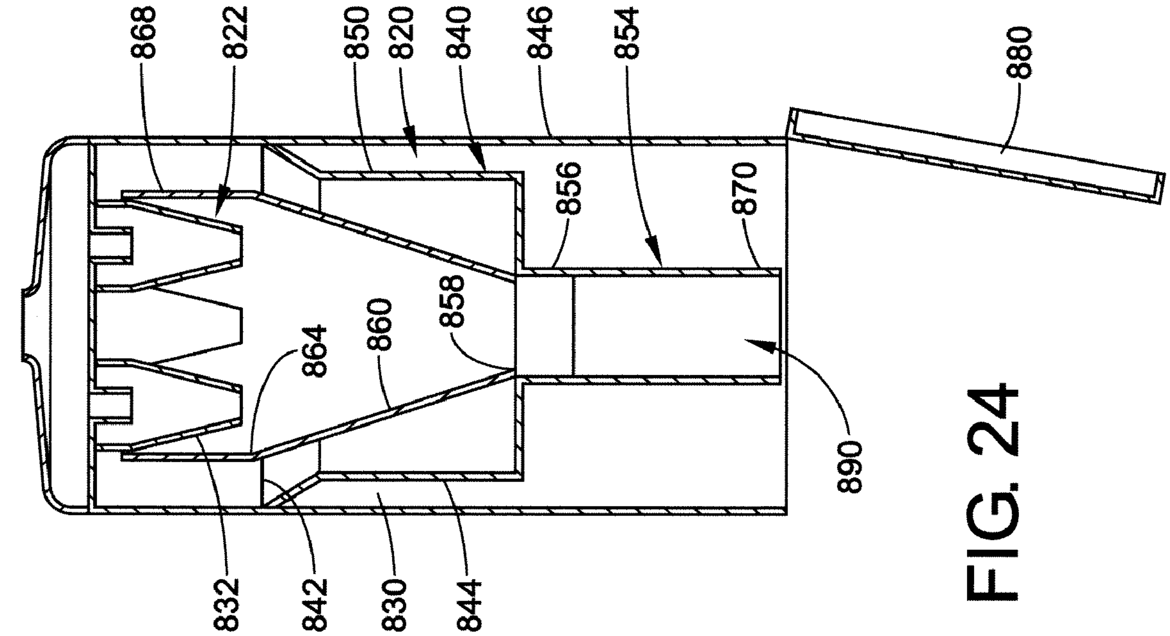
FIG. 24 is a cross-sectional view of the dual stage cyclonic dust collector of FIG. 23 showing the dirt collection cup mounted within the dust collector.
Figure 23:
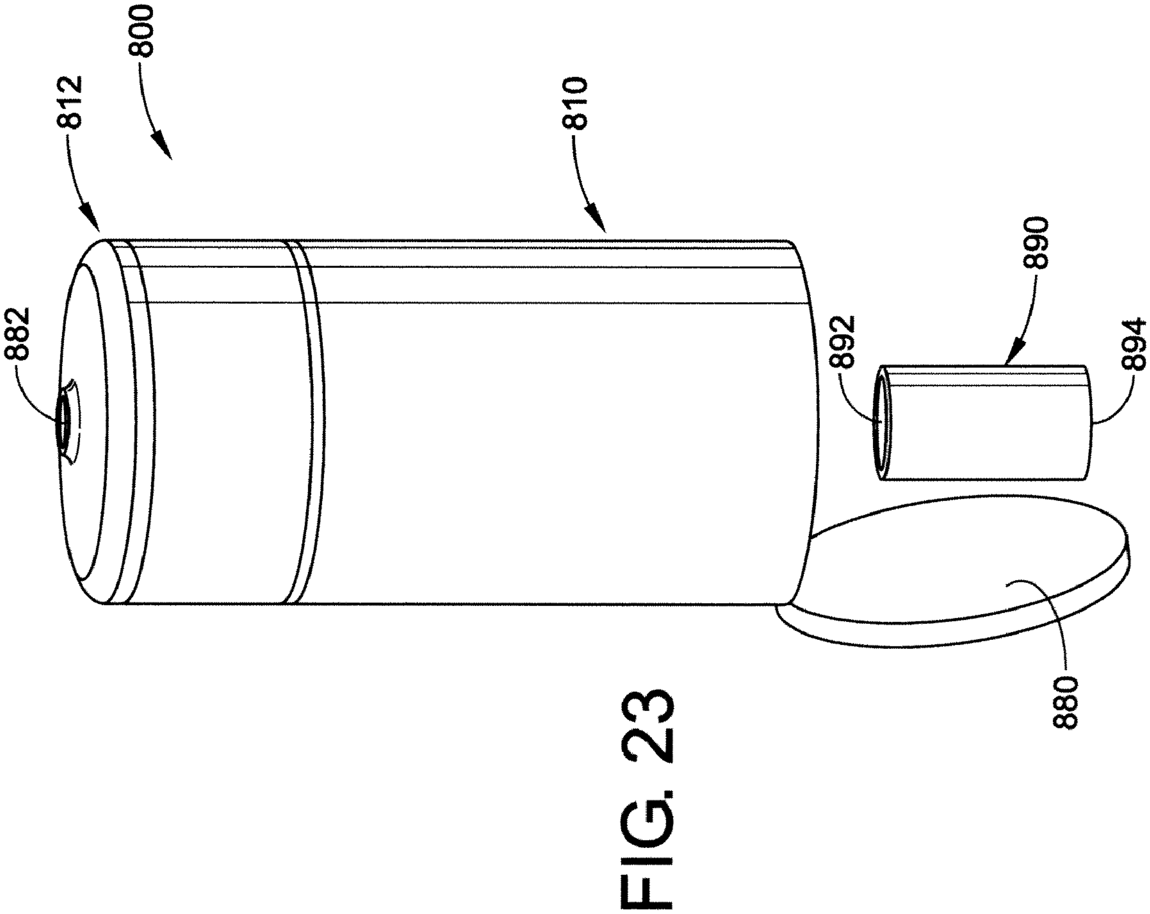
FIG. 23 is a perspective view illustrating a dual stage cyclonic dust collector in accordance with a fifth embodiment of the present invention showing a bottom lid in an open position and a dirt collection cup removed from the dust collector.
Figure 26:
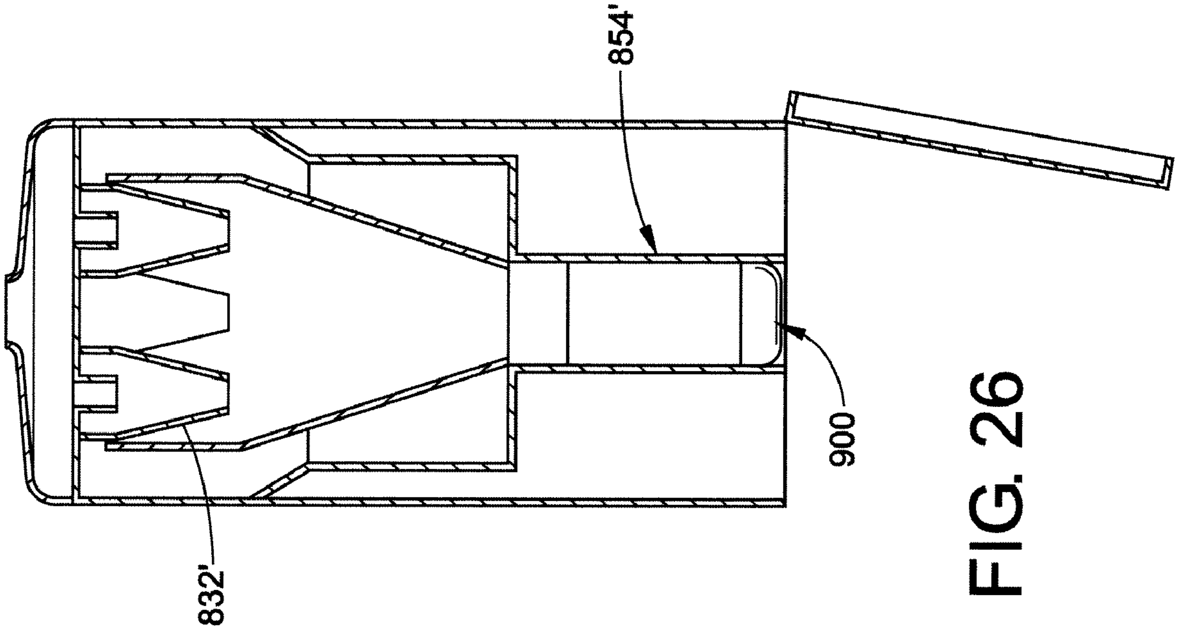
FIG. 26 is a cross-sectional view of the dual stage cyclonic dust collector of FIG. 25 showing the dirt retention cap mounted within the dust collector.

Fifth and sixth embodiments of a dual stage cyclonic dust collector are shown in FIGS. 23-24 and FIGS. 26-26, respectively.

In the fifth embodiment, a dust collector 800 includes a cyclone main body 810 and lid or cover unit 812 attached to an upper portion of the cyclone main body. The cyclone main body 810 includes a first cyclone part 820 and a separate second cyclone part 822. The first cyclone part comprises a generally cylindrical-shaped first stage cyclone separator 830. The second cyclone part comprises a plurality of spaced apart, frusto-conical, downstream, second stage cyclonic separators 832 arranged in parallel and mounted outside of the first cyclone part 820. The cover unit at least partially encases or surrounds the plurality of downstream separators.

Fluidly connecting the first cyclone part 820 to the second cyclone part 822 is a perforated tube 840. The perforated tube is disposed within the first stage separator 830 and extends longitudinally, downwardly from a top wall 842 of the separator. The perforated tube includes a cylindrical section 844 which is generally parallel to the interior surface of a separator sidewall 846. A plurality of openings 850 is located around a portion of the circumference of the cylindrical section. The openings serve as an outlet from the first stage separator to the second stage separators. A lower end of the perforated tube is closed by a generally tubular member 854. An open upper end 856 of the tubular member is in communication with an open lower end 858 of a generally frusto-conical shaped member 860 disposed within the perforated tube. An upper open end 864 of the frusto-conical member 860 is connected to a sidewall 868 of the second cyclone part 822. An open lower end 870 of the tubular member 854 is closed by a bottom lid or cover 880, which is hingedly connected to the cyclone main body 810.

As discussed previously with respect to the operation of the first embodiment, the first cyclone part separates dust from dust-laden air and the second cyclone part separates remaining dust particles from the air. The cleaned air is exhausted from the second stage separators 832 into the cover unit 812 before being discharged through a cleaned air outlet 882 to an inlet of an electric motor and fan assembly. Dirt separated in the first stage separator collects on the bottom lid 880. Fine dirt separated in the downstream cyclonic separators falls down the frusto-conical member 860 and into the tubular member 854.

In the fifth embodiment of FIGS. 23 and 24, located within the tubular member and adjacent the bottom lid is a removable dirt collection cup 890 having an open upper end 892 and a closed lower end 894. A seal ring can be fitted around at least one of the cup upper and lower end to create a seal between the dirt collection cup and the tubular member. The dirt collection cup is configured to collect the separated fine dirt. Thus, the dust collector 800 is configured to independently store and separately empty dirt and dust particles separated by the respective first and second cyclone parts 820, 822. To empty the dirt separated by the first stage separator, the bottom lid 880 can be opened. To empty the dirt separated by the second stage separators, the dirt collection cup 890 can be detached from the tubular member 854 and emptied. This minimizes the amount of fine dust introduced into ambient air during servicing of the household cleaning appliances. A separately emptying second dirt collection cup is advantageous since the first stage dirt collection chamber fills much more frequently than does the second stage dirt collection chamber or cup. The cup can be transparent so as to visibly indicate when emptying is needed.

Figure 25:
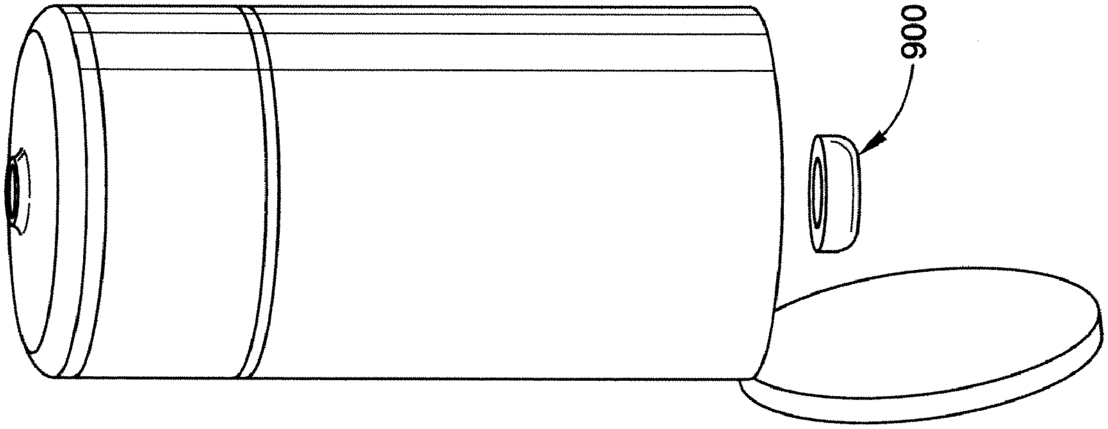
FIG. 25 is a perspective view illustrating a dual stage cyclonic dust collector in accordance with a sixth embodiment of the present invention showing a bottom lid in an open position and a dirt retention cap removed from the dust collector.

In the sixth embodiment of FIGS. 25 and 26, like components are identified by like numerals with a primed (') suffix and new components are identified by new numerals. In this embodiment, a dirt retention cap 900 can be removably secured within a tubular member 854' via conventional means. For example, the cap can be threadedly secured within the tubular member. It should be appreciated that alternate means for removably securing the cap are also contemplated. A seal ring can be fitted around the cap to create a seal between the cap and the tubular member. Fine dirt separated in several downstream cyclonic separators 832' collects in the tubular member 854' on the cap 900. To empty the collected fine dirt, the cap is removed from the tubular member. The cap 900 can be transparent, as can at least the lower portion of the tubular member 854', in order to allow a user to see when emptying is needed.

In another embodiment (not illustrated), a second bottom lid can be pivotally mounted within the tubular member 854' to collect the fine dirt separated by the downstream separators 832'. Again, a seal ring can be fitted around the second bottom lid to create a seal between the second lid and the tubular member. A second hinge assembly can be used to mount the second bottom lid to a bottom portion of the tubular member. Each bottom lid can be separately opened which allows for independent, selective emptying of dirt and dust particles separated by the respective first and second cyclone parts.

Similar to the first and second embodiments, a seventh embodiment of a dust collector for a dual stage cyclone vacuum cleaner is shown in FIGS. 27-34.

Figure 27:
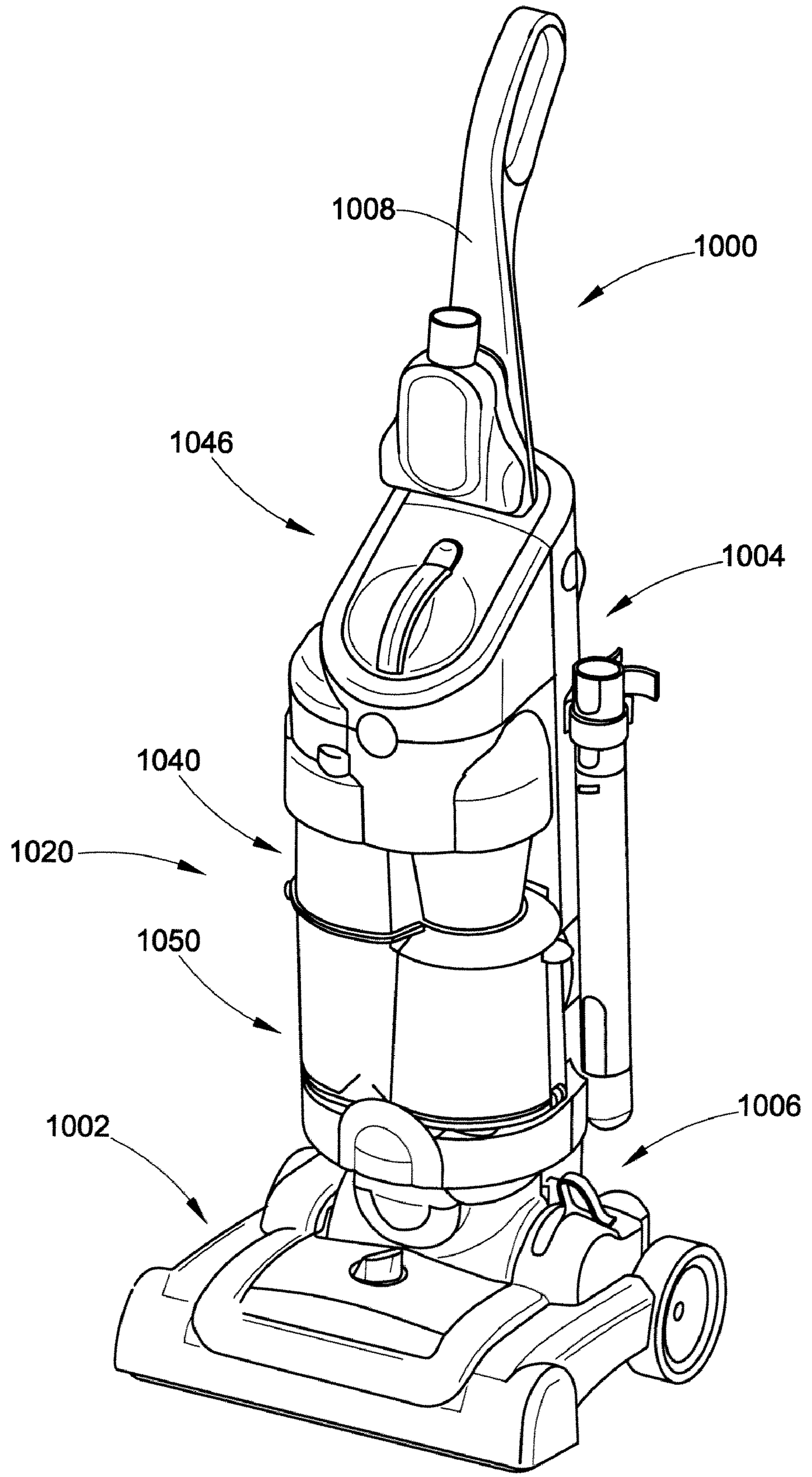
FIG. 27 is a front perspective view illustrating a dual stage cyclone vacuum cleaner in accordance with a seventh embodiment of the present invention.
Figure 28:
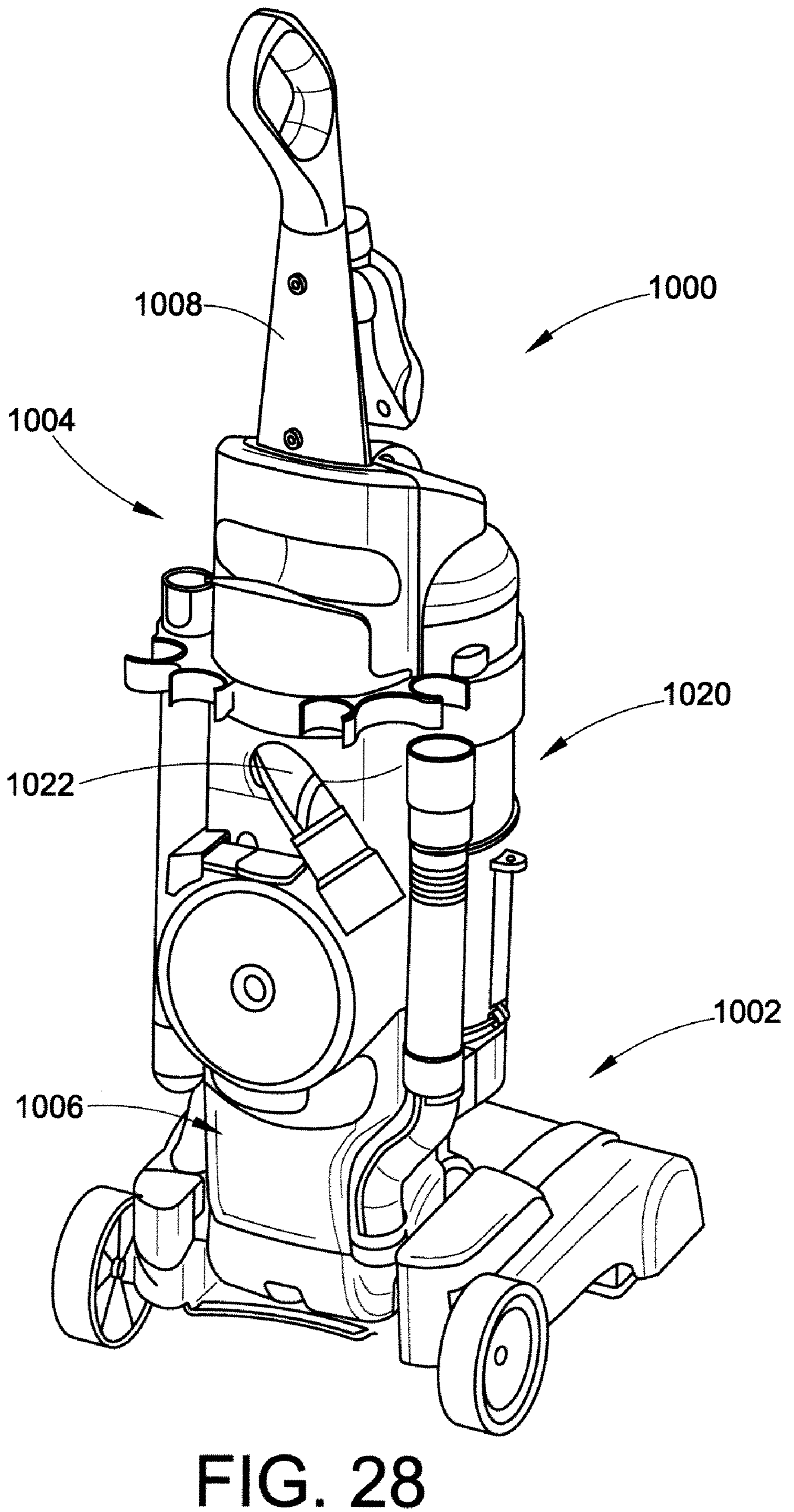
FIG. 28 is a rear perspective view of the dual stage cyclone vacuum cleaner of FIG. 27.
Figure 29:
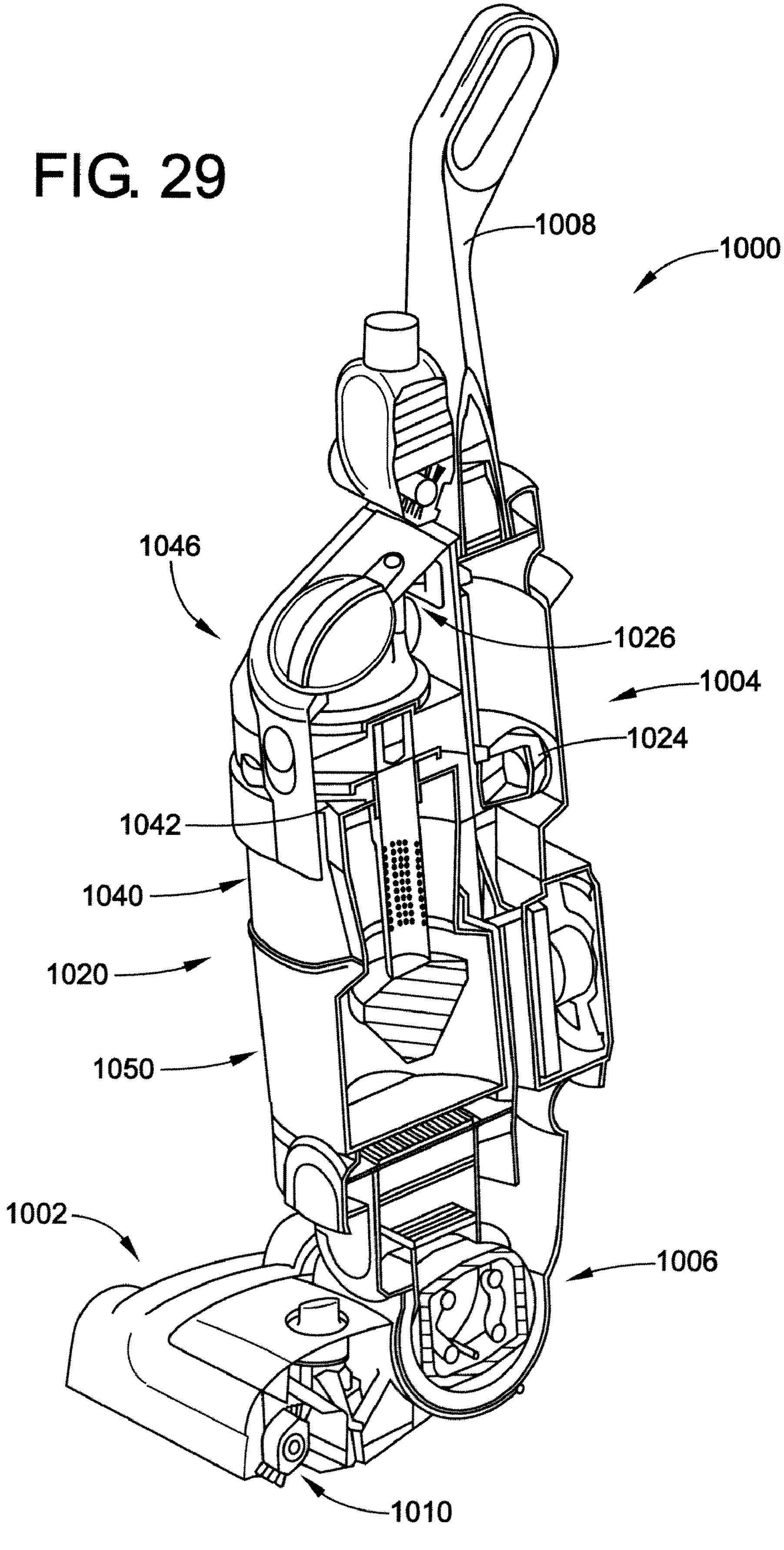
FIG. 29 is a right side cross-sectional view of the dual stage cyclone vacuum cleaner of FIG. 27.

With reference to FIG. 27-29, an upright dual stage vacuum cleaner 1000 generally includes a nozzle base 1002 and a housing 1004 mounted atop the nozzle base via conventional means. Mounted to one of the nozzle base and the upper housing is an electric motor and fan assembly 1006. A handle 1008 extends upward from the housing, by which an operator of the dual stage cyclone vacuum cleaner is able to grasp and maneuver the vacuum cleaner. An underside of the nozzle base includes a main suction opening 1010 formed therein, which is in fluid communication with a dust collector 1020 through a conduit 1022. A section 1024 of the conduit directs dust-laden air tangentially into the dust collector. A latch assembly 1026 can be mounted to the dust collector for releasably securing the dust collector to the housing.

Figure 30:
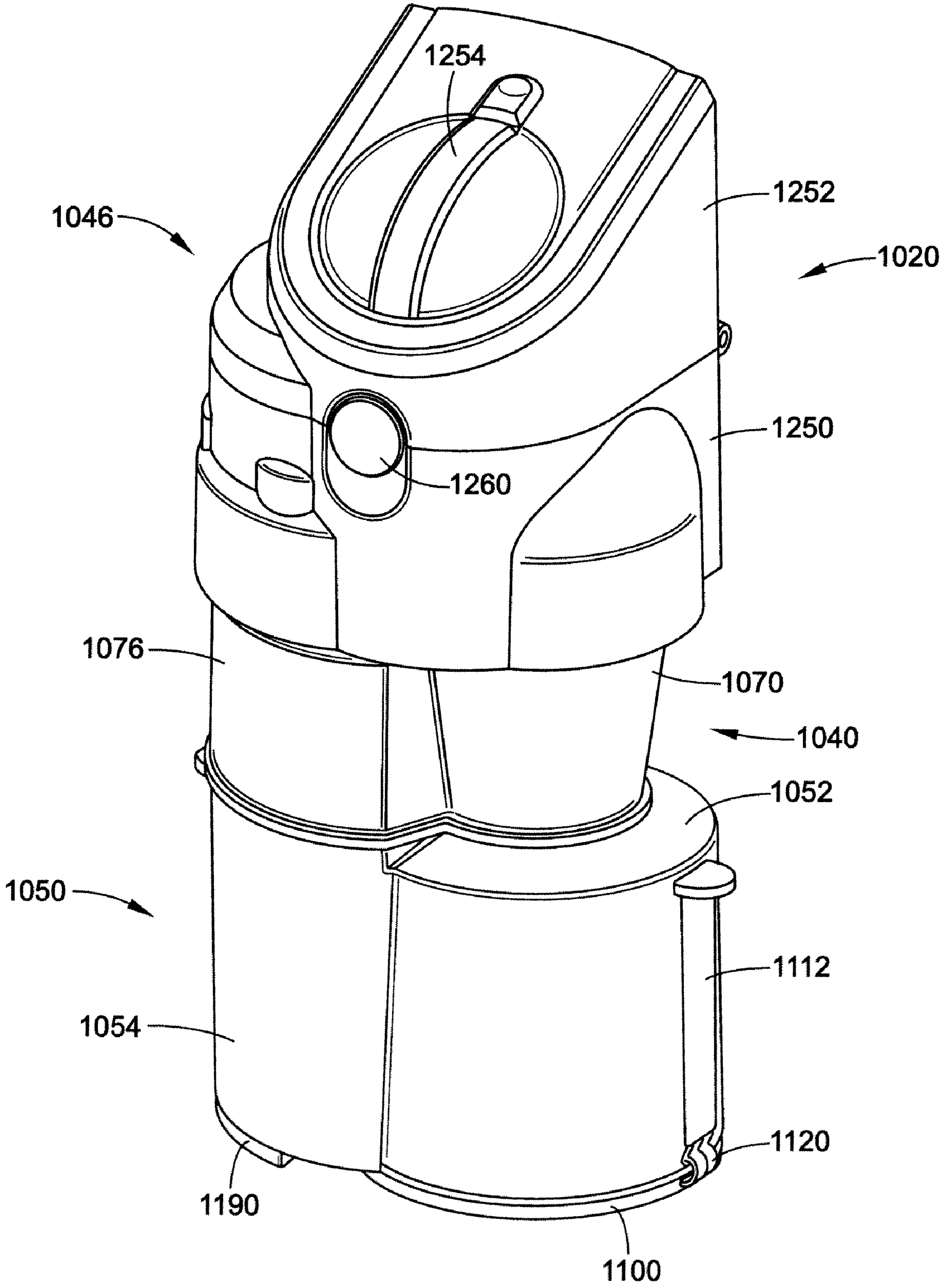
FIG. 30 is a front perspective view of an assembled dust collector for the dual stage vacuum cleaner of FIG. 27.
Figure 31:
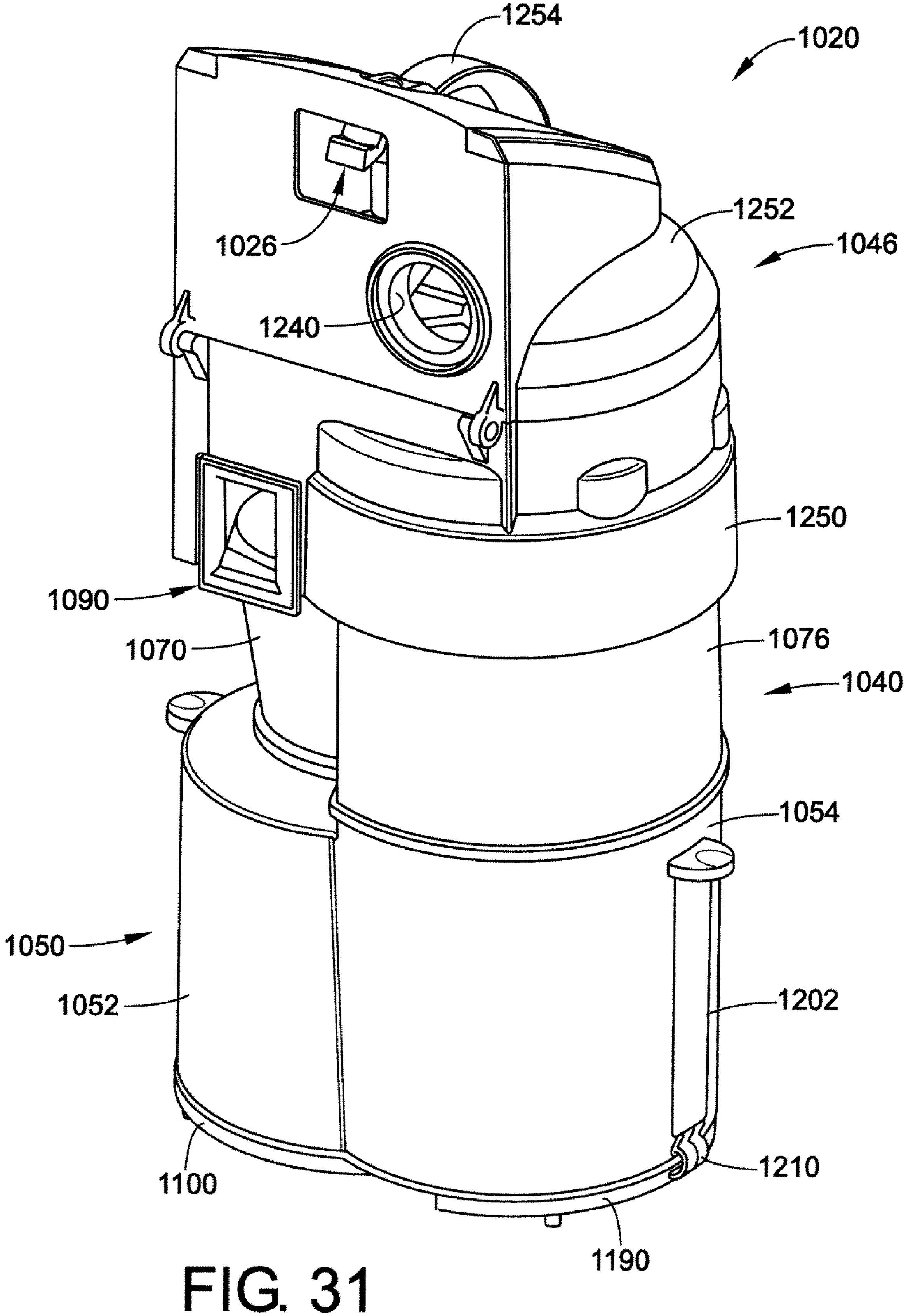
FIG. 31 is a rear perspective view of the assembled dust collector for the dual stage vacuum cleaner of FIG. 27.
Figure 32:
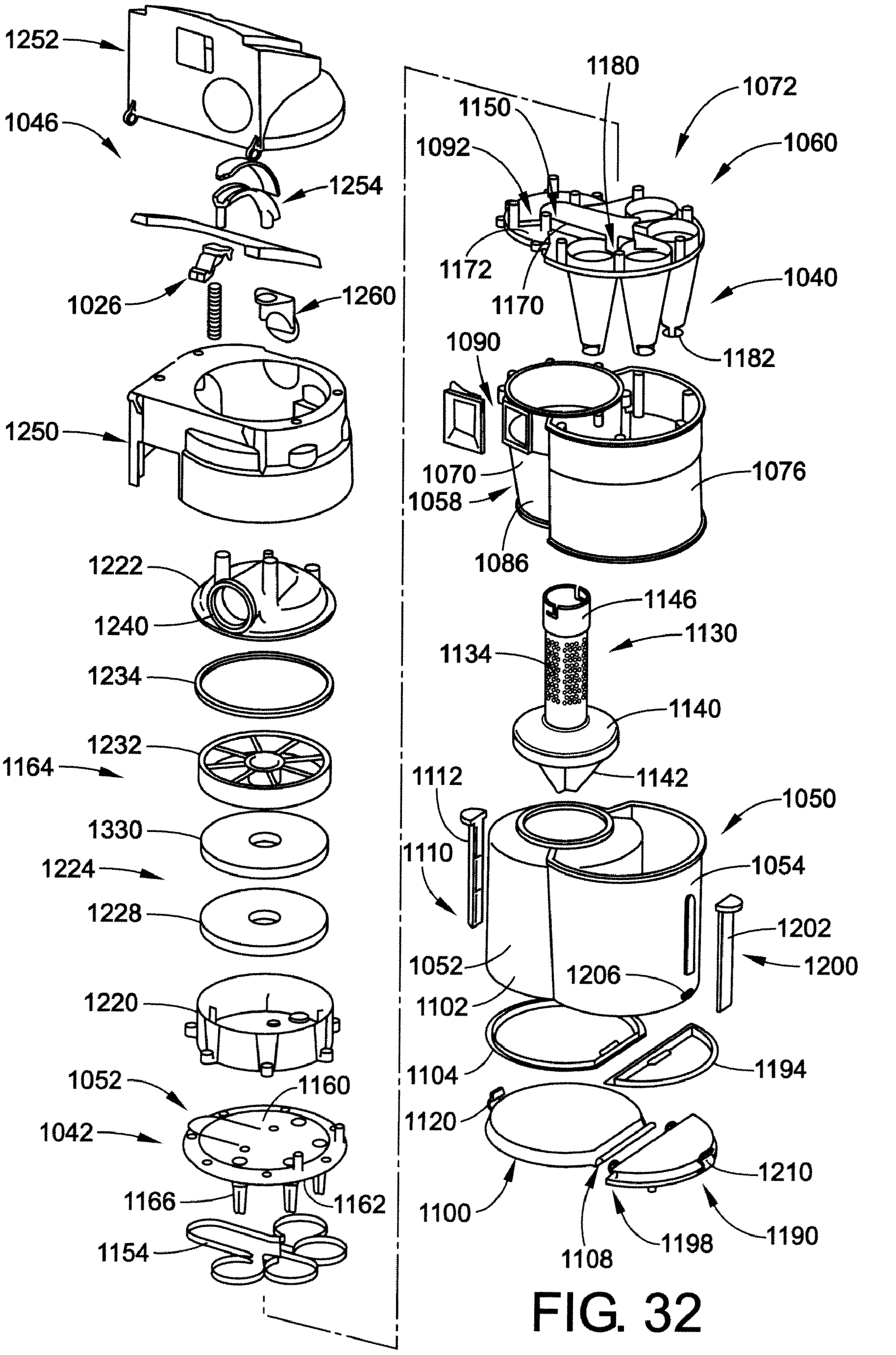
FIG. 32 is an enlarged exploded perspective view of the dust collector of the dual stage vacuum cleaner of FIG. 27, together with associated components thereof.

With reference to FIGS. 30-32, the dust collector 1020 includes a cyclone main body 1040, an air manifold 1042 and cover unit 1046 attached to an upper portion of the cyclone main body, and a dirt cup 1050 connected with a lower portion of the cyclone main body. The dirt cup includes a first dust collection chamber 1052 and a second dust collection chamber 1054. Similar to the previous embodiments, the first and second dust collection chambers are configured to independently store and empty dirt and dust particles separated by the respective first and second cyclone parts.

The cyclone main body 1040 includes a first cyclone part 1058 and a separate second cyclone part 1060. The first cyclone part comprises a generally frusto-conical shaped first stage cyclone separator 1070 mounted atop the first dust collection chamber 1052. However, it should be appreciated that the first cyclone part can comprise a generally cylindrical shaped first stage cyclone separator. The second cyclone part comprises a plurality of spaced apart, frusto-conical, downstream, second stage cyclonic separators 1072 arranged in parallel and mounted on the air manifold 1042 outside of the first cyclone part 1058. An outer cover 1076, which is releasably mounted atop the second dust collection chamber 1054, at least partially encases or surrounds the plurality of downstream separators. The outer cover sealingly abuts an outer surface of a sidewall 1086 of the first cyclone part.

Figure 33:
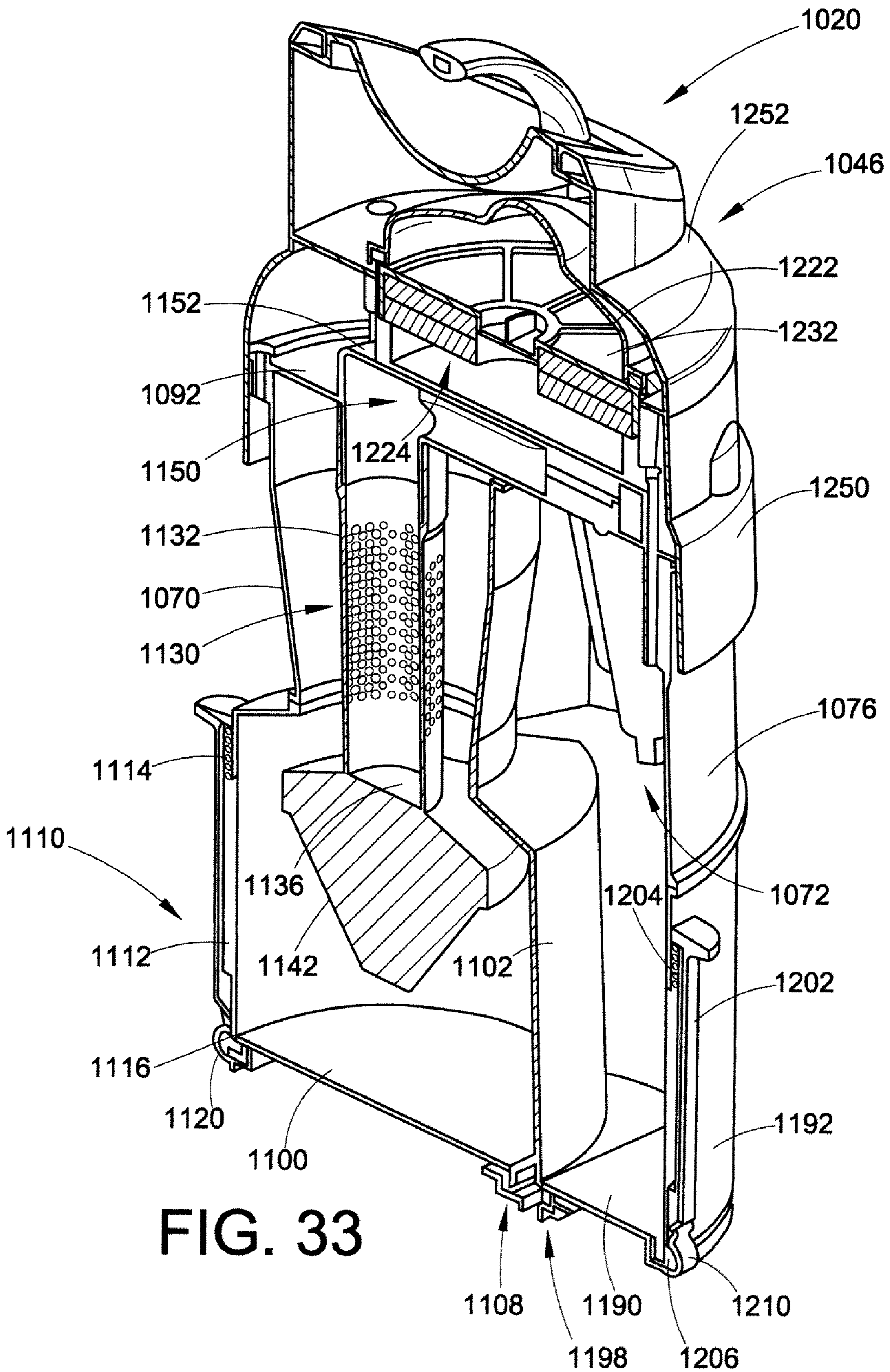
FIG. 33 is a cross-sectional of the assembled dust collector of FIG. 31.

With reference again to FIG. 32, and additional reference to FIG. 33, the first stage separator 1070 includes a dirty air inlet conduit 1090 and the sidewall 1086 having an outer surface and an inner surface. The outer surface of the sidewall can form at least a part of an external surface of the vacuum cleaner 1000. The airflow into the first stage separator 1070 is tangential which causes a vortex-type, cyclonic or swirling flow. Such vortex flow is directed downwardly in the first stage separator by a bottom guide plate 1092 of the air manifold 1042. Cyclonic action in the first stage separator removes a substantial portion of the entrained dust and dirt from the suction air stream and causes the dust and dirt to be deposited in the first dust collection chamber 1052 of the dirt cup 1050.

Figure 34:
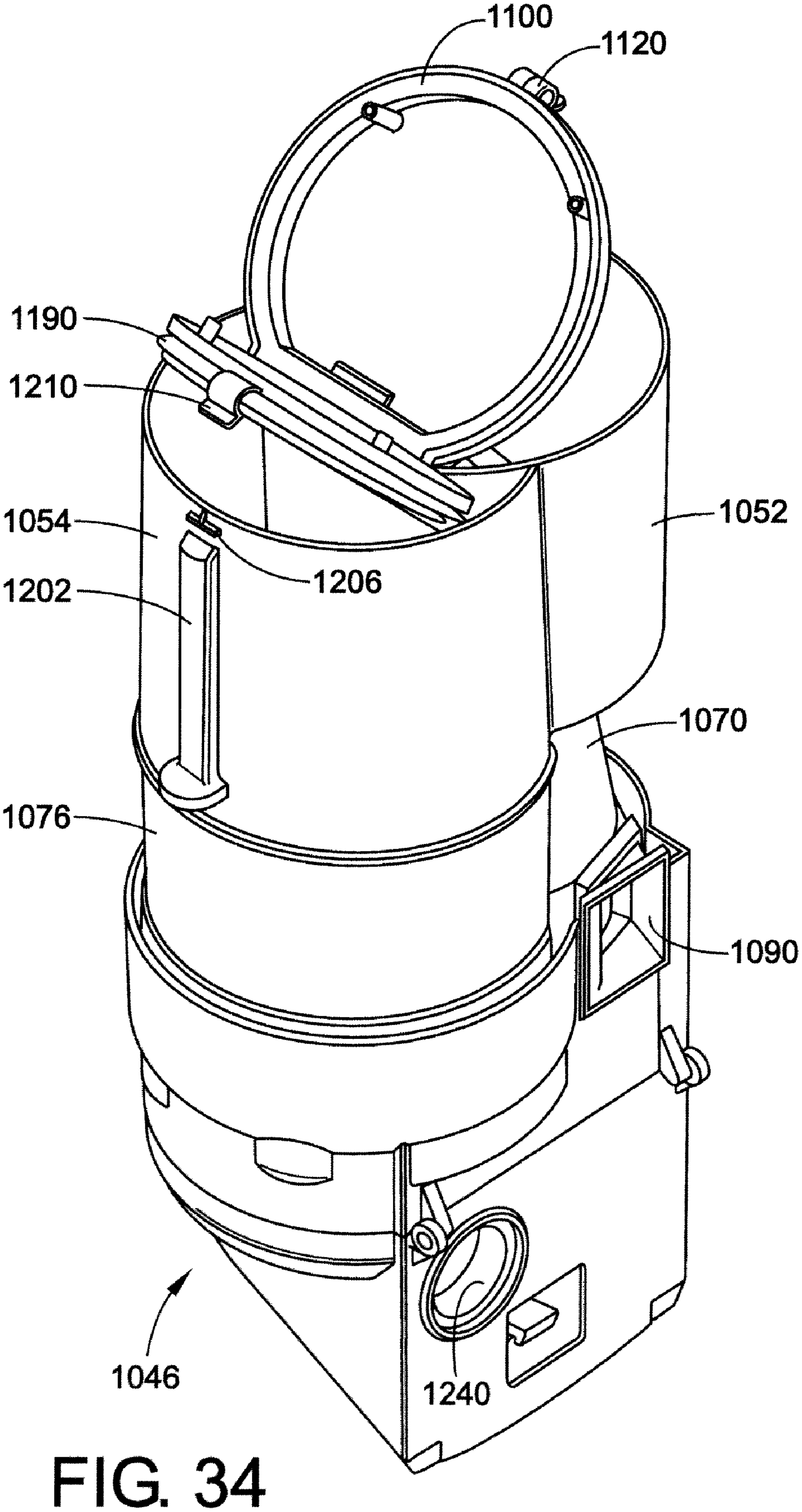
FIG. 34 is a bottom perspective view of the dust collector of FIG. 30 showing a first bottom lid for a first dust cup in a first open position and a second bottom lid for a second duct cup in a second open position.

With reference to FIGS. 32-34, operably secured to the cyclone main body 1040 is a first bottom plate or lid 1100, which allows for emptying of the first dust collection chamber 1052. The first lid 1100 pivotally and sealingly engages a lower portion of the wall 1102 of the first dust collection chamber 1052. A seal ring 1104 can be fitted around the first bottom lid to create a seal between the first lid and the dirt cup. A first hinge assembly 1108 can be used to mount the first bottom lid 1100 to a lower portion of the dirt cup 1050. The first hinge assembly allows the first bottom lid to be selectively opened so that dirt and dust particles that were separated from the air stream by the first stage separator 1070 can be emptied from the first dust collection chamber 1052. A first latch assembly 1110, which can be located diametrically opposed from the first hinge assembly 1108, normally maintains the first bottom lid 1100 in a closed position. In the depicted embodiment, the first latch assembly includes a first arm 1112, a biasing member, such as a spring 1114, and a first projection 1116 located on the wall 1102 and a first latch 1120 located on the first lid. In use, as the first arm is pushed downwardly, the first arm engages the first latch and moves the first latch off of the first projection allowing the first lid to open.

Similar to the previous embodiments, fluidly connecting the first cyclone part 1058 to the second cyclone part 1060 is a perforated tube 1130. The perforated tube is disposed within the first stage separator 1070 and extends longitudinally therein. The perforated tube includes a generally cylindrical section 1132 including a plurality of openings or perforations 1134 located around a portion of the circumference of the cylindrical section. The openings 1134 serve as an outlet from the first stage separator 1070, allowing the partially cleaned fluid to enter the second cyclone part 1060.

Connected to a lower, closed end 1136 of the perforated tube is a shroud 1140 for retarding an upward flow of dirt and dust particles that have fallen below the first stage separator 1070. A laminar flow member, such as one or more baffles or fins 1142, is mounted to the closed lower end 1136 of the perforated tube 1130. At least a portion of the laminar flow member is encircled by the shroud. An upper end or air outlet 1146 of the perforated tube 1130 is in fluid communication with an air inlet section 1150 of the air manifold 1042 positioned above the first stage separator 1070.

As shown in FIGS. 32 and 33, the air manifold 1042 includes the bottom guide plate 1092, the air inlet section 1150 and a top guide plate 1152. The guide plates form an air passage for directing partially cleaned air from the perforated tube 1130 to the second cyclone part 1060. A seal ring 1154 can be fitted between the guide plates to create a seal. The top guide plate 1152 is provided under the cover unit 1046 and includes a top wall 1160 and a plurality of discharge guide tubes 1162. Each of the discharge guide tube has a generally cylindrical shape and projects downward from the top wall. The discharge guide tubes direct the cleaned air exhausted from the second stage separators 1072 into a filter assembly 1164. Each discharge guide tube can include a laminar flow member to stop the air from circulating within the discharge tube. As shown in FIG. 32, the laminar flow member is a generally cross-shaped baffle 1166. However, it should be appreciated that other shapes are also contemplated. The bottom guide plate 1092 is spaced away from the top guide plate 1152 by a generally continuous, peripheral barrier 1170 extending upwardly from a wall 1172. The barrier and wall 1160 define an air passage from the manifold air inlet section 1150 to the second stage separators 1072.

With reference again to FIGS. 32 and 33, the downstream separators 1072 project downwardly from the bottom guide plate 1092. Each downstream separator includes a dirty air inlet 1180 in fluid communication with the air inlet section 1150. The air manifold directs a volume of partially cleaned air generally tangentially into the inlet 1180 of each second stage separator 1072. This causes a vortex-type, cyclonic or swirling flow. Such vortex flow is directed downwardly in the downstream separator since a top end thereof is blocked by the top guide plate 1152. Each downstream separator includes a dust blocking member 1182 which limits turbulence in the second dust collection chamber 1054 and prevents re-entrapment of dirt that has fallen into the second dust collection chamber into the cleaned air exiting each downstream separator.

The dirt separated by each downstream separator 1072 is collected in the second dust collection chamber 1054. With reference again to FIGS. 32-34, operably secured to the cyclone main body 1040 is a second bottom plate or lid 1190, which allows for emptying of the second dust collection chamber 1054. The second lid 1190 pivotally and sealingly engages a lower portion of the wall 1192 of the second dust collection chamber 1054. Again, a seal ring 1194 can be fitted around the second bottom lid to create a seal between the second lid and the dirt cup. A second hinge assembly 1198 can be used to mount the second bottom lid 1190 to a lower portion of the dirt cup 1050. A second latch assembly 1200 normally maintains the second bottom lid in a closed position. Similar to the first latch assembly, the second latch assembly includes a second arm 1202, a biasing member, such as a spring 1204, and a second projection 1206 located on the wall 1192 and a second latch 1210 located on the second lid.

As with the previous embodiments, the two lids 1100 and 1190 can be interconnected in order that, for example, the second lid 1190 cannot be opened unless the first one has already been opened. Also, the lids 1100 and 1190 can be mounted to the dirt cup 1050 either directly or indirectly. While a single dirt cup, having two dust collection chambers is shown in this embodiment, it should be appreciated that two separate dirt cups could also be employed. In that case, the dirt cups could be spaced from each other, if so desired.

As indicated previously, each discharge guide tube 1162 directs the cleaned air exhausted from the second cyclone part 1160 into the filter assembly 1164 housed in the cover unit 1046 before being discharged to an inlet of the electric motor and fan assembly 1006. As shown in FIG. 32, the filter assembly includes a lower plenum 1220 and an upper plenum 1222. The lower plenum collects a flow of cleaned air from the downstream separators 1072 and directs the cleaned air through a two stage filter element 1244 for filtering any remaining fine dust remaining in the airflow exiting the downstream separators. The two stage filter element can be a compound member with a coarse foam layer 1228 and a fine foam layer 1330, at least partially housed in the lower plenum. Located downstream therefrom can be a pleated filter 1232, such as a High-Efficiency Particulate Arresting HEPA) grade filter, housed in the top plenum. A seal ring 1234 can be used to create a seal between the upper and lower plenums. The upper plenum collects a flow of cleaned air from the filters and directs the flow of cleaned air into a cleaned air outlet conduit 1240, which is in fluid communication with the inlet of the electric motor and fan assembly.

With reference again to FIGS. 30-32, the cyclone cover unit 1046 includes a bottom housing 1250 and a top housing 1252 having a handle 1254. The two stage filter element 1224 and the pleated filter 1232 can both be easily serviced by removing the top housing from the bottom housing. For example, the top housing can be pivotally mounted to the bottom housing. A push button latch assembly 1260 can be operably mounted to cover unit for releasably locking the top housing to the bottom housing. The bottom housing is configured to cover an upper portion of both the first and second cyclone parts 1058 and 1060.

As to a further discussion of the structure, manner of usage and operation of the seventh embodiment, the same should be apparent from the above description relative to the first embodiment. Accordingly, no further discussion relating to the manner of usage and operation will be provided.

The present invention has been described with reference to the several embodiments. Obviously, modifications and alterations will occur to others upon reading and understanding the preceding detailed description. It is intended that the present invention be construed as including all such modifications and alterations insofar as they come within the scope of the appended claims or the equivalents thereof.

What we claim is:

1. A home cleaning appliance comprising:

a housing comprising a nozzle, including a main suction opening and a brush;

an air stream suction source, mounted to said housing and including a suction airstream inlet and a suction airstream outlet, said suction source selectively establishing and maintaining a suction airstream from said nozzle main suction opening to said airstream outlet;

a cyclone main body, mounted to said housing and in communication with said nozzle main suction opening, said cyclone main body including:

an upstream, first, cyclonic separator for separating dust from dust-laden air, and at least one downstream, second, cyclonic separator for separating remaining dust particles from the air; and a dirt cup connected to said cyclone main body, said dirt cup including:

a first particle collector communicating with said first separator for collecting dust particles separated by said first separator, and a second particle collector communicating with said at least one second separator for collecting dust particles separated by said at least one second separator, wherein said first particle collector and said second particle collector are configured to empty independently of each other, and a first closure member operably secured to said cyclone main body for emptying of said first particle collector, and a second closure member operably secured to said cyclone main body for emptying of said second particle collector.

2. The appliance of claim 1, wherein at least one of said first particle collector and said second particle collector can be selectively detached from said dirt cup.

3. The appliance of claim 1, wherein at least one of said first separator and said at least one second separator is selectively detachable from said housing.

4. The appliance of claim 3, wherein at least one of said first particle collector and said second particle collector is selectively detachable from said dirt cup.

5. The appliance of claim 1, wherein said cyclone main body is selectively detachable from said housing and wherein at least one of said first particle collector and said second particle collector is selectively detachable from said cyclone main body.

6. The appliance of claim 1, wherein said second particle collector includes an upper collection section in communication with a lower collection section, said upper collection section generally surrounding an upper portion of said first separator, a bottom portion of said upper collection section being tapered to promote sliding and transferring of remaining dust particles separated by said at least one second separator from said upper collection section into said lower collection section.

7. The appliance of claim 1, further comprising:

a perforated tube extending along a longitudinal axis of said first separator, and an air manifold disposed above said cyclone main body, said perforated tube and said air manifold fluidly connecting said first separator to said at least one second separator.

8. The appliance of claim 7, wherein said perforated tube includes at least one internally mounted fin configured to eliminate cyclonic flow inside said perforated tube.

9. The appliance of claim 8, wherein said air manifold includes an inlet passage in communication with an outlet of said perforated tube, at least one of said inlet passage and said perforated tube includes a varying cross-sectional area for allowing air stream to be drawn into said perforated tube by way of the venturi effect.

10. The appliance of claim 7, wherein said at least one second separator includes a plurality of cyclonic separators and said manifold includes a plurality of separate air conduits for directing a volume of partially cleaned air generally tangentially into an inlet of each second stage separator.

11. The appliance of claim 1, wherein said first separator includes a dirty air inlet, a top wall and a sidewall having an outer surface and an inner surface, wherein said outer surface of said sidewall forms at least a part of an external surface of said housing.

12. The appliance of claim 1, wherein said at least one second separator includes a dust blocking member which is inclined at an acute angle relative to a longitudinal axis of said at least one second separator.

13. An upright vacuum cleaner comprising:

a nozzle base having a main suction opening;

a housing pivotally mounted on said nozzle base;

an airstream suction source mounted to one of said housing and said nozzle base for selectively establishing and maintaining a suction airstream from said nozzle main suction opening to an exhaust outlet of said suction source; and a cyclone main body mounted to said housing, said cyclone main body comprising:

a first upstream cyclone part for separating coarse dust from dust-laden air, and a second downstream cyclone part for separating remaining dust particles from the air;

a first particle collector mounted to said housing and communicating with said first cyclone part for collecting a first portion of dust particles, said first particle collector including a first closure member operably secured to said first particle collector for emptying said first particle collector; and a separate second particle collector mounted to said housing and communicating with said second cyclone part for collecting a second portion of dust particles, said second particle collector including a second closure member operably secured to said second particle collector for independent emptying of said second particle collector.

14. The vacuum cleaner of claim 13, wherein at least one of said first particle collector and said second particle collector can be selectively detached from said housing.

15. The vacuum cleaner of claim 13, wherein at least one of said first cyclone part and said second cyclone part can be selectively detached from said cyclone main body.

16. The vacuum cleaner of claim 13, wherein said second cyclone part includes a plurality of cyclonic separators arranged in parallel.

17. A household vacuum cleaner, comprising:

a first housing section including a suction opening, and at least one wheel to allow said first housing section to roll over a subjacent surface;

a second housing section connected to said first housing section;

an airstream suction source mounted to one of said first and second housing sections;

a cyclone main body mounted to said second housing section and including:

an upstream separator stage including an upstream cyclone, and a downstream separator stage including a plurality of downstream cyclones;

wherein said airstream suction source communicates with said first housing section suction opening via said cyclone main body so that an airstream flows from said suction opening through said upstream cyclone, said plurality of downstream cyclones and to an inlet of said airstream suction source;

a first particle collector communicating with said upstream cyclone; and a second particle collector communicating with said plurality of downstream cyclones, wherein said second particle collector is configured to empty independently of said first particle collector; and a first closure member operably secured to said cyclone main body for emptying of said first particle collector; and a second closure member operably secured to said cyclone main body for emptying of said second particle collector.

18. The vacuum cleaner of claim 17 further comprising a closure member for selectively closing said second particle collector.

19. The vacuum cleaner of claim 18 further comprising a fastening member cooperating with said closure member of said second particle collector to selectively maintain said closure member in a closed position.

20. A home vacuum cleaner including:

a housing in fluid communication with a main suction opening and a brush roll rotatably mounted in said main suction opening;

an airstream suction source mounted to said housing for selectively establishing and maintaining a suction airstream flowing from said main suction opening to an exhaust outlet of said suction source; and a dirt collector mounted to said housing, said dirt collector comprising:

a first upstream cyclone part for separating dust from dust-laden air, a second downstream cyclone part for separating remaining dust particles from the air, a first particle collector communicating with said first cyclone part for collecting dust particles, a second particle collector communicating with said second cyclone part for collecting dust particles, said first particle separator generally surrounding said second particle collector, wherein said first particle collector and said second particle collector are configured to independently store and separately empty dirt and dust particles separated by the respective first and second cyclone parts, a first closure member operably secured to said first particle collector for emptying of said first particle collector, and a second closure member operably secured to said second particle collector for emptying of said second particle collector.

21. The vacuum cleaner of claim 20, wherein said second cyclone part includes a plurality of cyclonic separators arranged in parallel.

22. The vacuum cleaner of claim 20, wherein said second particle collector is selectively removable from said dust collector.

23. The vacuum cleaner of claim 20, wherein said first closure member includes a top surface and said second closure member includes a bottom surface, said bottom surface being spaced from said top surface.

24. The vacuum cleaner of claim 20, wherein said first closure member has a diameter which is larger than a diameter of said second closure member.

* * * * *